(12) United States Patent
Stammreich

(10) Patent No.: US 6,722,669 B1
(45) Date of Patent: Apr. 20, 2004

(54) ADJUSTABLE SUSPENSION SYSTEM FOR A VEHICLE

(76) Inventor: John C. Stammreich, 21 Santa Catalina Dr., Rancho Palos Verdes, CA (US) 90275

( * ) Notice: Subject to any disclaimer, the term of this patent is extended or adjusted under 35 U.S.C. 154(b) by 0 days.

(21) Appl. No.: 09/861,032

(22) Filed: May 18, 2001

Related U.S. Application Data

(60) Provisional application No. 60/205,659, filed on May 18, 2000.

(51) Int. Cl.$^7$ ............................ B60G 3/26; B60G 11/18; B60G 17/02
(52) U.S. Cl. ............................ 280/5.514; 280/6.157; 280/124.137; 280/124.138; 280/124.167; 180/425; 267/274; 267/277
(58) Field of Search ............................ 280/5.514, 6.155, 280/6.157, 124.135, 124.136, 124.137, 124.138, 124.166, 124.167; 267/273, 274, 277, 278; 180/425

(56) References Cited

U.S. PATENT DOCUMENTS

| | | | | |
|---|---|---|---|---|
| 2,094,582 A | * | 10/1937 | Chapman | 280/124.141 |
| 2,757,014 A | * | 7/1956 | Schmitz | 280/773 |
| 2,788,982 A | * | 4/1957 | Allison | 280/124.137 |
| 2,818,273 A | * | 12/1957 | Weihsmann | 280/5.514 |
| 3,118,687 A | * | 1/1964 | Forbush | 280/124.136 |
| 3,161,419 A | * | 12/1964 | Schaaf | 280/124.136 |
| 3,680,881 A | * | 8/1972 | Douglas | 280/124.15 |
| 3,704,895 A | * | 12/1972 | Remaud | 280/6.158 |
| 3,711,113 A | * | 1/1973 | Stammreich | 280/124.136 |

* cited by examiner

*Primary Examiner*—Peter C. English
(74) *Attorney, Agent, or Firm*—Martine & Penilla, LLP

(57) ABSTRACT

An adjustable suspension system includes a torsion spring, four Scott-Russell linkages for each wheel of the vehicle, and a worm gear for rotating the torsion spring. At least one of the Scott-Russell linkages for each wheel is responsive to the torsion spring to adjust the ride height of the vehicle while maintaining a substantially constant camber angle for the wheel. In one exemplary method for adjusting the ride height of a vehicle, a dynamic parameter of the vehicle is sensed and, based on the sensed dynamic parameter, the torsion spring is automatically rotated to change the orientation of the Scott-Russell linkages and thereby adjust the ride height of the vehicle. The dynamic parameter may be the speed of the vehicle, the pitch and body roll of the vehicle, or the lateral acceleration of the vehicle. The operation of automatically rotating the torsion spring may be controlled by a microprocessor.

8 Claims, 15 Drawing Sheets

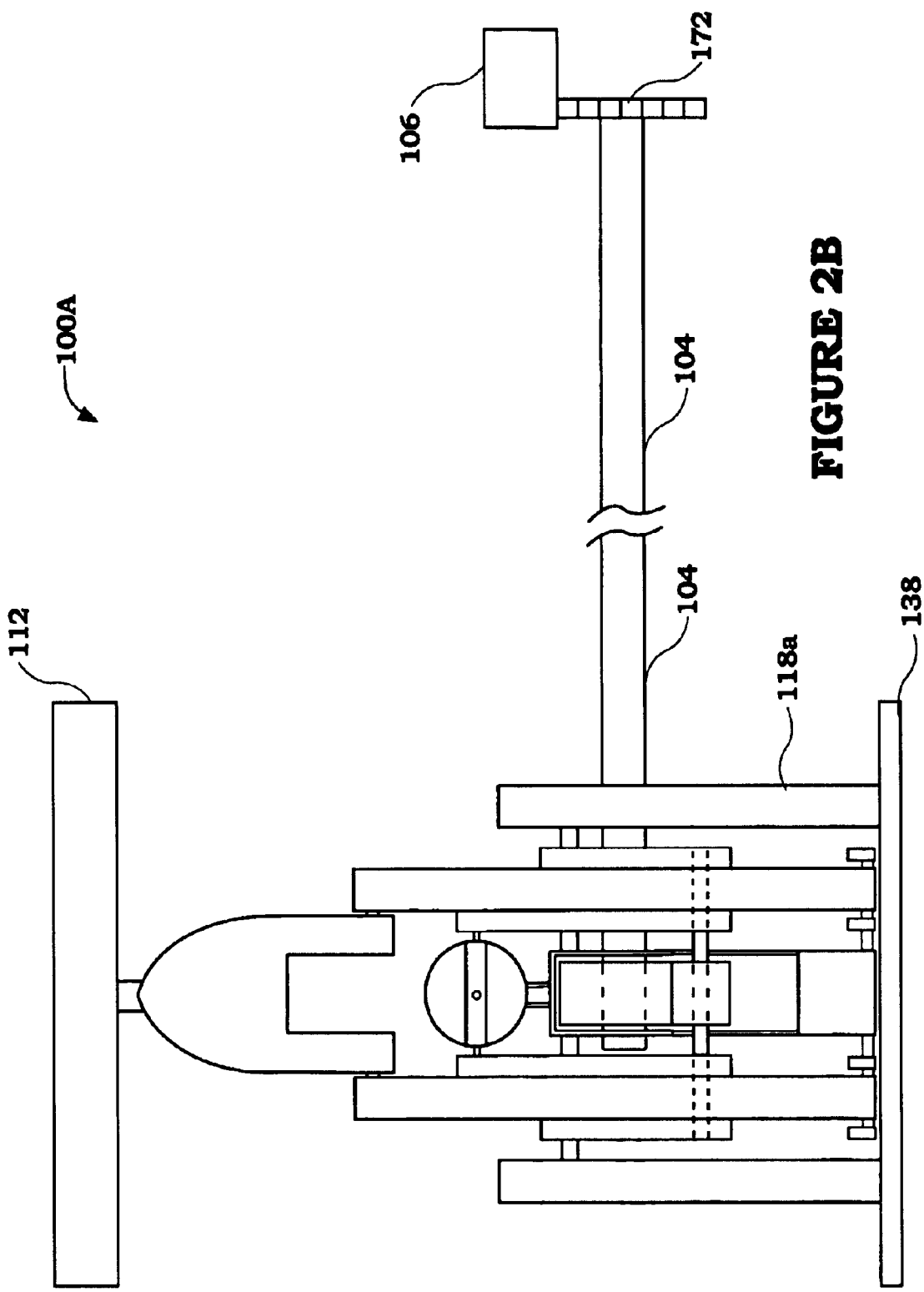

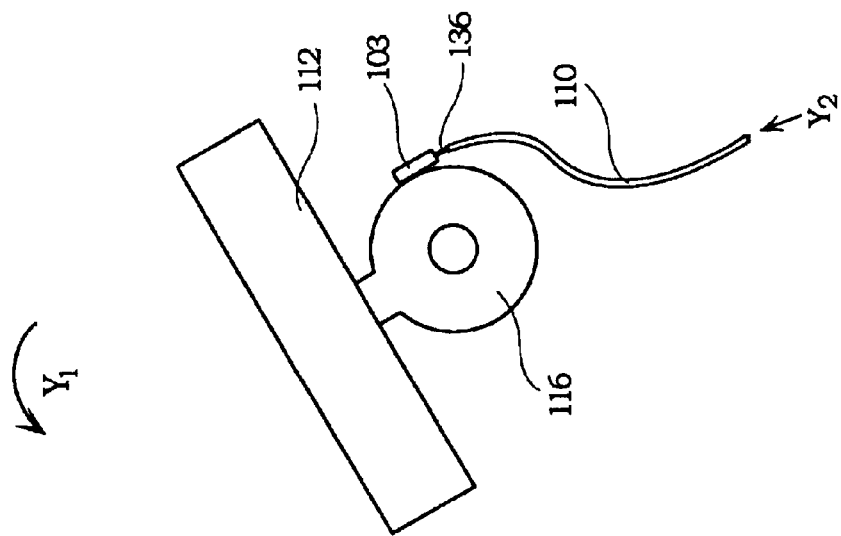
FIGURE 14D
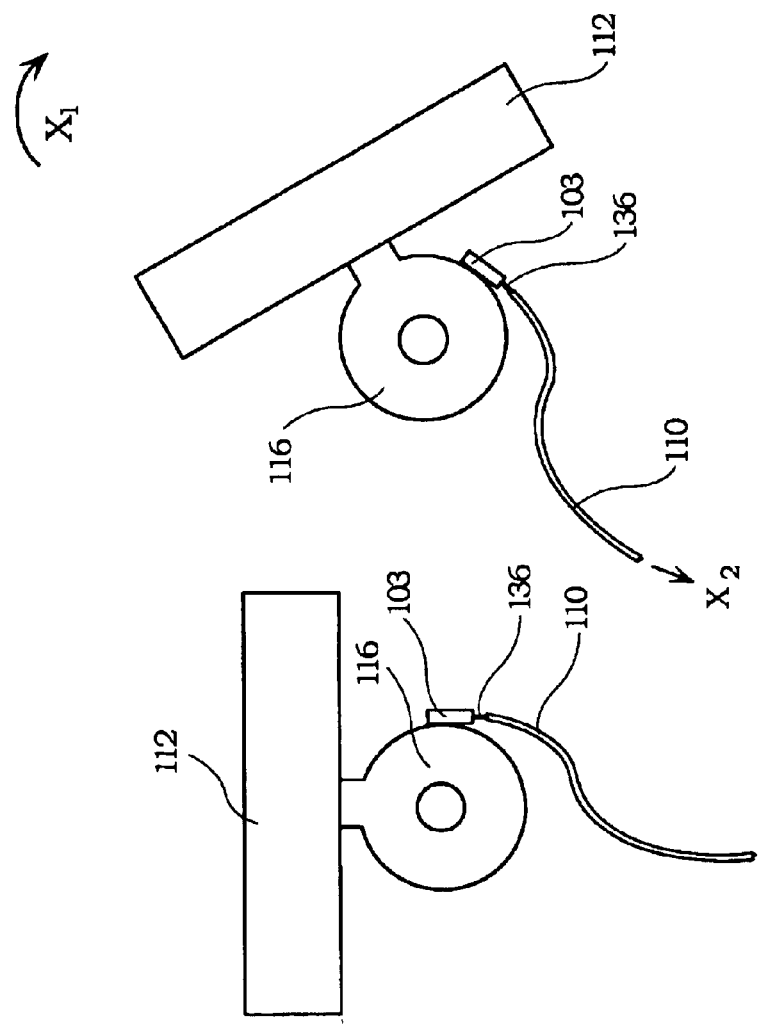
FIGURE 14C
FIGURE 14B

ADJUSTABLE SUSPENSION SYSTEM FOR A VEHICLE

CLAIM FOR PRIORITY

This application claims priority under 35 U.S.C. §119(e) from U.S. Provisional Patent Application No. 60/205,659, filed May 18, 2000, and entitled "Remotely-Adjustable Suspension System for a Vehicle." The disclosure of this provisional application is incorporated herein by reference.

BACKGROUND OF THE INVENTION

The present invention relates generally to motorized vehicles and, more particularly, to an adjustable suspension system for such vehicles.

Over the past decade, vehicles capable of off-road driving, e.g., sport utility vehicles (SUVs), have become increasingly popular. For off-road driving, these vehicles require increased ride height, i.e., ground clearance, to avoid obstacles, e.g., rocks, bumps, and other irregularities, and to provide the distance required to absorb the additional forces caused by such obstacles. This increased ride height also brings a number of disadvantages, however, including high roll center, high effective frontal area, decreased stability, decreased cornering ability, and lower fuel economy. As such, the increased ride height required for off-road driving is not well suited for high-speed travel on smooth, paved surfaces.

An ideal suspension system would provide a low ride height for medium and high speed travel on smooth, paved surfaces and a high ride height for low to medium speed travel on unpaved, irregular surfaces. With such an ideal suspension system, high-speed operation would occur only at low ride height, thereby optimizing cornering ability, fuel economy, traction, and safety. Unfortunately, conventional single-pivot suspension systems do not allow for any significant adjustment in ride height without sacrificing suspension performance and causing uneven tire wear. Typically, a coil spring or spring/damper can be used to adjust the ride height of a single-pivot suspension system. However, the amount of adjustment that can be made before significant adverse effects on wheel camber, ride harshness, and safety occur is minimal. To be commercially viable, a suspension system should have a useful adjustment range of at least 6 inches to 8 inches without adversely impacting the ride quality, cornering performance, or tire life. This range of adjustment is not possible with conventional single-pivot suspension systems.

In view of the foregoing, there is a need for an adjustable suspension system that enables the ride height of a vehicle to be adjusted over a wide range without sacrificing handling, performance, tire wear, or safety.

SUMMARY OF THE INVENTION

Broadly speaking, the present invention fills this need by providing an adjustable suspension system that includes four Scott-Russell linkages for each wheel of a vehicle. The present invention also provides methods for adjusting the ride height of a vehicle.

In one aspect of the invention, a vehicle suspension system for adjusting the ride height of a vehicle is provided. For each wheel of the vehicle, the vehicle suspension system includes four structure arms, with each of the structure arms having an outer control link pivotably attached thereto. The vehicle suspension system also includes four primary links and four inner control arms. One end of each of the primary links is configured to be coupled to a spindle yolk. One end of each of the inner control arms is configured to be coupled to a shock absorber. A torsion spring is provided, and one end of a torsion arm is rigidly attached to the torsion spring. One end of an attachment link is pivotably attached to the other end of the torsion arm. A pin extends through apertures in the attachment link, two of the inner control arms, two of the primary links, and two of the outer control links.

Two translation links are pivotably attached at one end to respective ends of two of the four primary links, and at the other end to respective ends of the other two of the four primary links. Two rotation links are pivotably attached at one end to respective ends of two of the four primary links. The other end of each of the rotation links is configured to be pivotably attached to a frame of the vehicle. A worm gear for rotating the torsion spring is provided. When the torsion spring is rotated, the torsion arm rotates and in turn causes the attachment link to move the pin in an upward or downward direction. The upward or downward movement of the pin causes the four primary links to move in an upward or downward direction to adjust a ride height of a vehicle.

In one embodiment, the vehicle suspension system further includes a second pin that extends through apertures in one of the inner control arms, one of the primary links, and one of the outer control links, and a third pin that extends through apertures in another of the inner control arms, another of the primary links, and another of the outer control links. In one embodiment, the worm gear is manually controlled by a driver of a vehicle from within a cabin of the vehicle. In another embodiment, the worm gear is automatically controlled by a microprocessor. In this embodiment, the microprocessor receives inputs from devices that measure dynamic parameters of the vehicle, e.g., the speed of the vehicle, the pitch and body roll of the vehicle, and the lateral acceleration of the vehicle.

In another aspect of the invention, an adjustable suspension system for a vehicle is provided. The adjustable suspension system includes a torsion spring. For each wheel of the vehicle, linkage means for adjusting a ride height of the vehicle while maintaining a substantially constant camber angle for a wheel of the vehicle is provided. The linkage means is responsive to the torsion spring and is configured to be coupled to a spindle yolk. A means for rotating the torsion spring also is provided. The means for rotating the torsion spring may be either manually controlled by a driver of the vehicle from within the cabin of the vehicle or automatically controlled by a microprocessor.

In yet another aspect of the invention, one method for adjusting the ride height of a vehicle is provided. In this method, four Scott-Russell linkages are provided for each wheel of the vehicle. A torsion spring is rotated to change the orientation of the Scott-Russell linkages to adjust the ride height of the vehicle. In one embodiment, the method further includes maintaining a substantially constant steering ratio as the ride height of the vehicle is adjusted.

In a further aspect of the invention, another method for adjusting the ride height of a vehicle is provided. In this method, four Scott-Russell linkages are provided for each wheel of a vehicle. A dynamic parameter of the vehicle, e.g., the speed of the vehicle, the pitch and body roll of the vehicle, and the lateral acceleration, is sensed. Based on the sensed dynamic parameter, a torsion spring is automatically rotated to change the orientation of the Scott-Russell linkages and thereby adjust the ride height of the vehicle. In one embodiment, the operation of automatically rotating the torsion spring is controlled by the microprocessor. In one embodiment, the method further includes maintaining a substantially constant steering ratio as the ride height of a vehicle is adjusted.

In a still further aspect of the invention, a vehicle having an adjustable suspension system is provided. The vehicle includes a torsion spring, an adjustable suspension system for adjusting the ride height of the vehicle, a worm gear for rotating the torsion spring, and a steering assembly having a flexible cable that allows a substantially constant steering ratio to be maintained when the ride height of the vehicle is adjusted. The adjustable suspension system includes four Scott-Russell linkages for each wheel of the vehicle, with at least one of the Scott-Russell linkages for each wheel of the vehicle being responsive to the torsion spring to adjust a ride height of a vehicle while maintaining a substantially constant camber angle for the wheel.

The present invention provides a number of significant advantages. Most notably, the adjustable suspension system of the present invention enables the adjustment of the ride height of a vehicle over a long range of wheel travel, e.g., at least about 6 inches to about 8 inches, with little or no change in camber angle for each wheel. Because a substantially constant camber angle for each wheel of the vehicle is maintained, wider tires that provide better handling and traction may be used on the vehicle. The four Scott-Russell linkages provided for each wheel resist fore and aft lateral forces on the suspension system. In addition, the steering assembly maintains the steering performance of the suspension system as the ride height is adjusted and thereby eliminates the steering anomaly referred to as "bump steer."

BRIEF DESCRIPTION OF THE DRAWINGS

The accompanying drawings, which are incorporated in and constitute part of this specification, illustrate exemplary embodiments of the invention and together with the description serve to explain the principles of the invention.

FIG. 2B shows a suspension system without turning capabilities in accordance with one embodiment of the present invention.

FIG. 14B shows a tire turned in a neutral position in accordance with one embodiment of the present invention.

FIG. 14C shows a tire turned in a direction $X_1$ in accordance with one embodiment of the present invention.

FIG. 14D shows a tire turned in a direction $Y_1$ in accordance with one embodiment of the present invention.

DETAILED DESCRIPTION OF THE PREFERRED EMBODIMENTS

Several exemplary embodiments of the invention will now be described in detail with reference to the accompanying drawings. In the following description, the structure of the suspension system is described in detail with respect to one wheel of a vehicle. It should be appreciated that the suspension system is preferably used to support all the wheels of a vehicle, but, if desired, may be used in connection with only some of the wheels of a vehicle.

Figure 1A:
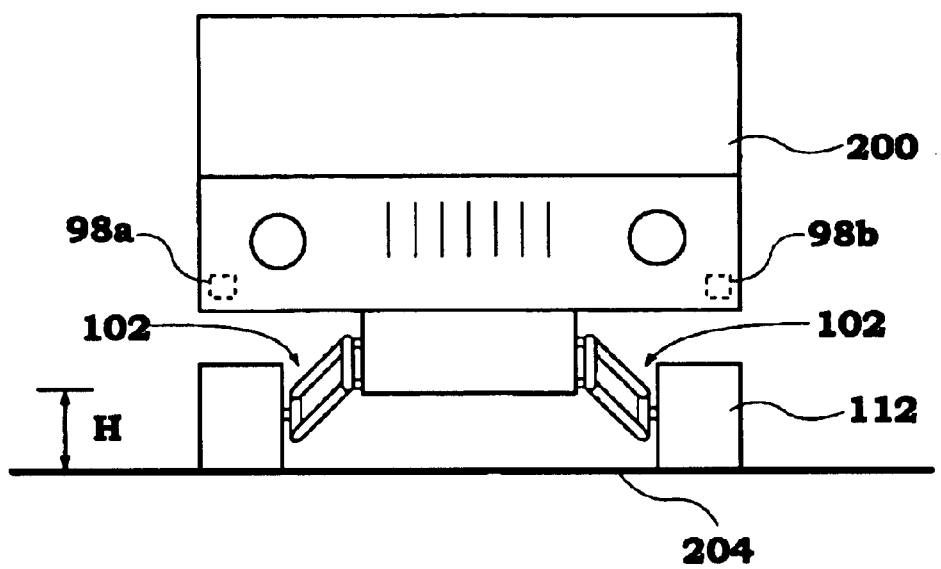
FIG. 1A illustrates an exemplary vehicle having an increased ride height.
Figure 1B:
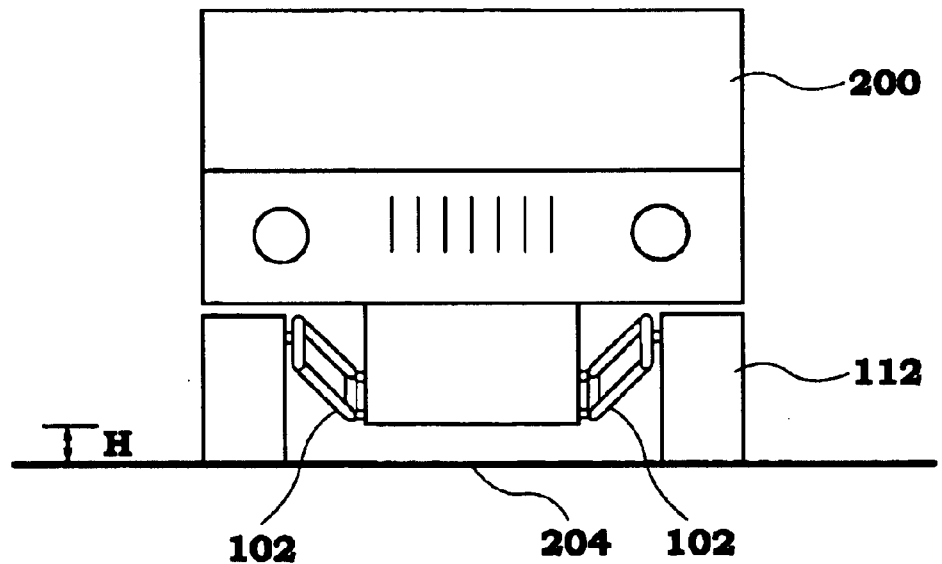
FIG. 1B shows the exemplary vehicle of FIG. 1A after the ride height has been decreased relative to that shown in FIG. 1A.

FIGS. 1A and 1B illustrate the suspension of the present invention in an increased ride height position and a decreased ride height position, respectively. As shown in FIG. 1A, suspension 102 has increased the ride height H of vehicle 200. Suspension 102 is mounted to a frame of the vehicle 200 and is attached to a tire 112, as explained in more detail below. The ride height H is defined as the distance between the underside of the vehicle 200 and a surface 204 (i.e., road surface) upon which the vehicle is traveling. Using the suspension 102, the ride height H of the vehicle 200 may be remotely adjusted with a suspension adjustment assembly, as will be explained in more detail below. As shown in FIG. 1B, suspension 102 has been adjusted from the position shown in FIG. 1A to decrease the ride height H so that the underside of vehicle 200 is closer to the surface 204.

Figure 2A:
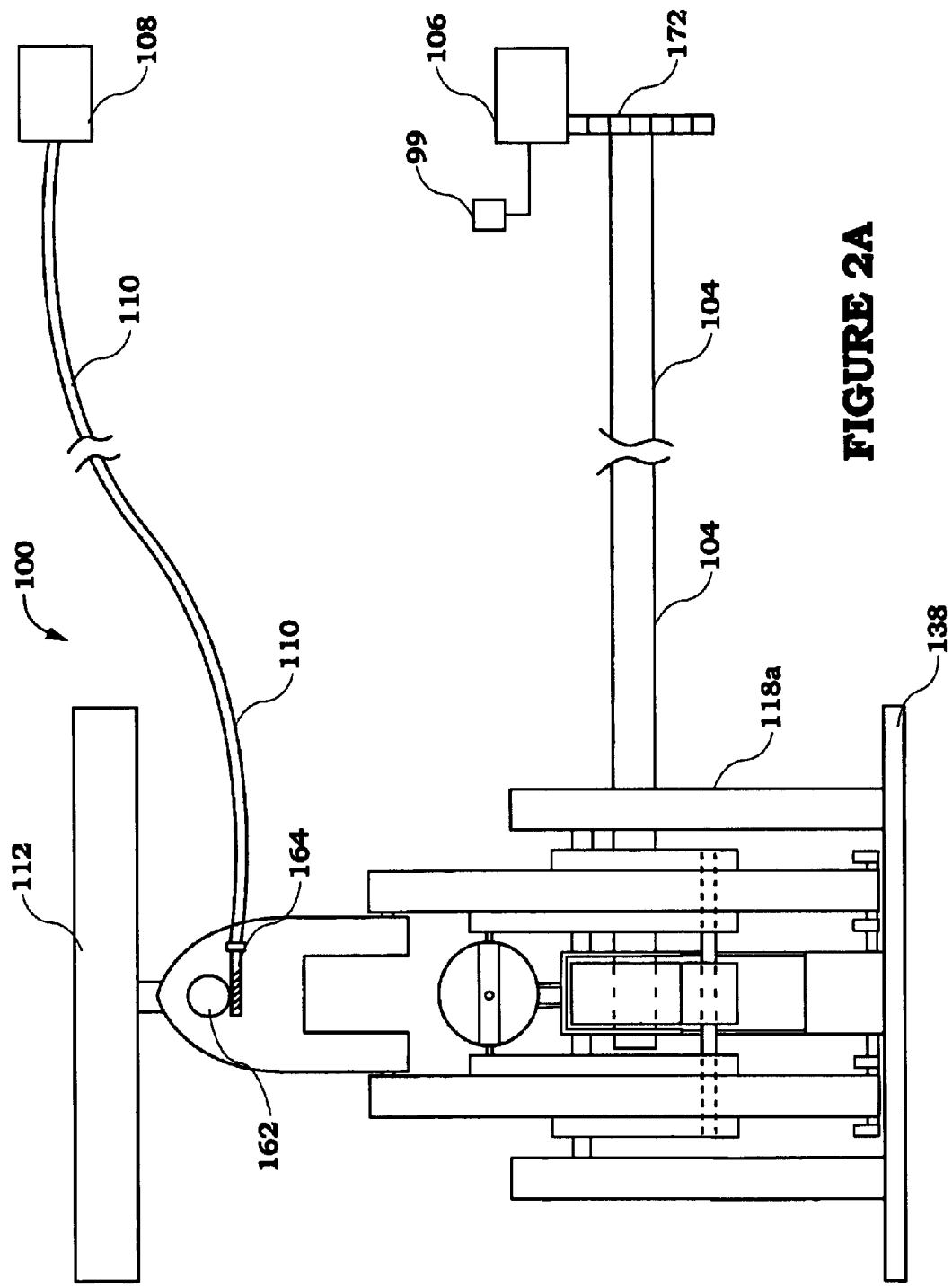
FIG. 2A shows a suspension system in accordance with one embodiment of the present invention.
Figure 7:
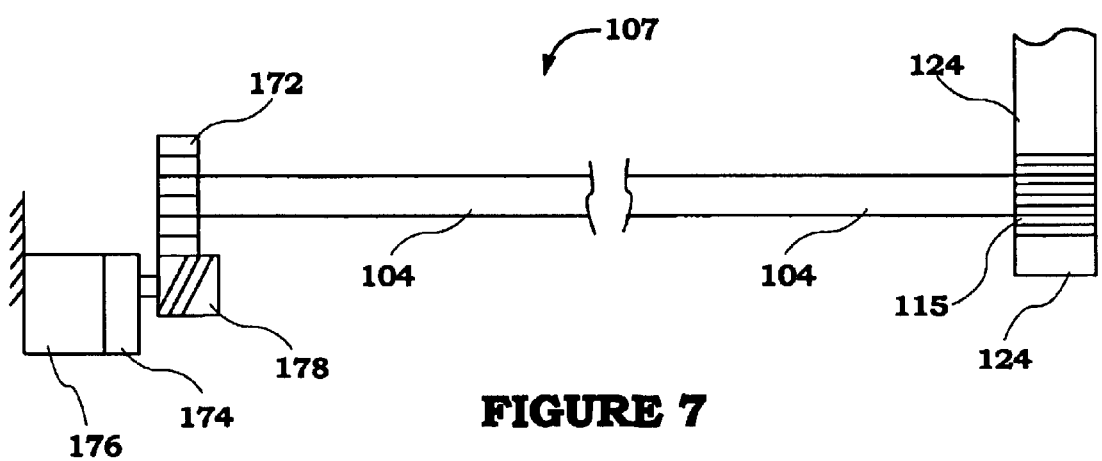
FIG. 7 illustrates a suspension adjustment assembly that controls the adjustment of a suspension in accordance with one embodiment of the present invention.

FIG. 2A shows a suspension system 100 in accordance with one embodiment of the present invention. The suspension 102 is shown rigidly attached to a frame 138 of the vehicle 200 by structure arms 118*a–d*. The neutral position of the suspension 102 is controlled by a control mechanism 106 which adjusts the anchor point 117 of the torsion spring 104, as will be described with reference to FIGS. 8A and 8B, to either decrease or increase the ride height H of the vehicle 200. The neutral position is defined as the ride height where the force necessary to adjust the torsion spring 104 is equivalent to the weight of the vehicle 200. The control mechanism 106 is mounted to the structure of the vehicle 200 as shown in FIG. 7 and activated by applying energy from the inside of the vehicle 200. Thus, a person inside the vehicle 200 or microprocessor 99 suitably disposed within the vehicle 200 may adjust the ride height H of the vehicle 200 by engaging the control mechanism 106. In one embodiment, a button is disposed inside vehicle 200 to enable a person inside the cabin or cockpit of the vehicle to engage the control mechanism 106.

The control mechanism 106 interfaces with the suspension 102 through a torsion spring 104. As will be described with respect to FIGS. 3 and 7, the torsion spring 104 is rigidly attached to the suspension 102 and the control mechanism 106. The torsion spring 104 supports the weight of the vehicle 200 and takes the load of an impact as the vehicle 200 hits irregularities (e.g., potholes, speed bumps, etc.) on the traveling surface 204. Significantly, the spring rate of the torsion spring 104 will not be affected by the adjustment of the ride height H of the vehicle 200. The spring rate of the torsion spring 104 is determined by the twisting ability (torsion angle/force relationship) of the torsion spring 104. As the suspension 102 decreases and increases the ride height H of the vehicle 200, the torsion spring rate of the torsion spring 104 will not be affected because the torsion spring deflection angle versus the load relationship is not changed when the ride height H is adjusted. Consequently, the load on the torsion spring 104 remains unchanged. As will be further explained with reference to FIG. 7 and FIGS. 8A and 8B, the control mechanism 106 rotates the anchor point 117 of the torsion spring 104 to adjust the suspension 102 in order to decrease or increase the ride height H of the vehicle 200.

The suspension 102 also allows the tire spindle 116 to turn so that the vehicle 200 may turn when entering or exiting a corner. The tire spindle 116 is turned under the control of a steering mechanism 108. The steering mechanism 108 connects to the suspension 102 via a flex cable 110, which is connected to worm 164 of a worm gear assembly that also includes worm gear 162, as will be more fully described with reference to FIGS. 13A–C and FIGS. 14A–D. Those skilled in the art will recognize that a steering assembly is not necessary when the suspension of the present invention is used on a rear wheel of a vehicle, as shown in FIG. 2B.

FIG. 2B shows the suspension system 100A without turning capabilities in accordance with one embodiment of the present invention. In this embodiment, the suspension 102 does not include the flex cable 110 and the steering mechanism 108 as shown in FIG. 2A. In addition, the suspension system 100A does not include a worm 164 or a worm gear 162 as shown with reference to FIG. 2A. This suspension system would be used on a vehicle that does not require steering or a portion of a vehicle that does not require steering such as, for example, the rear portion of a vehicle.

Figure 3:
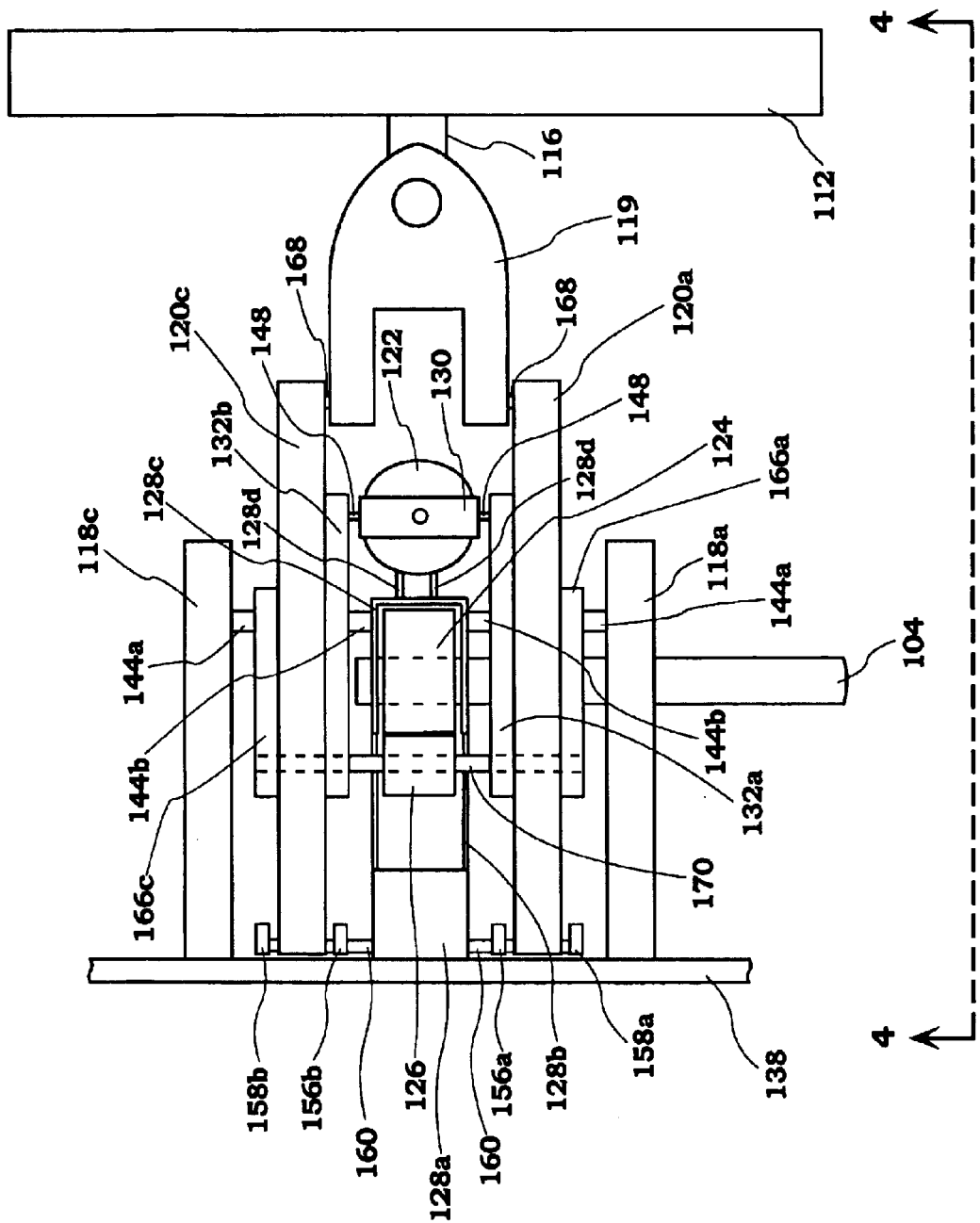
FIG. 3 is a top view of a suspension in accordance with one embodiment of the present invention.
Figure 4:
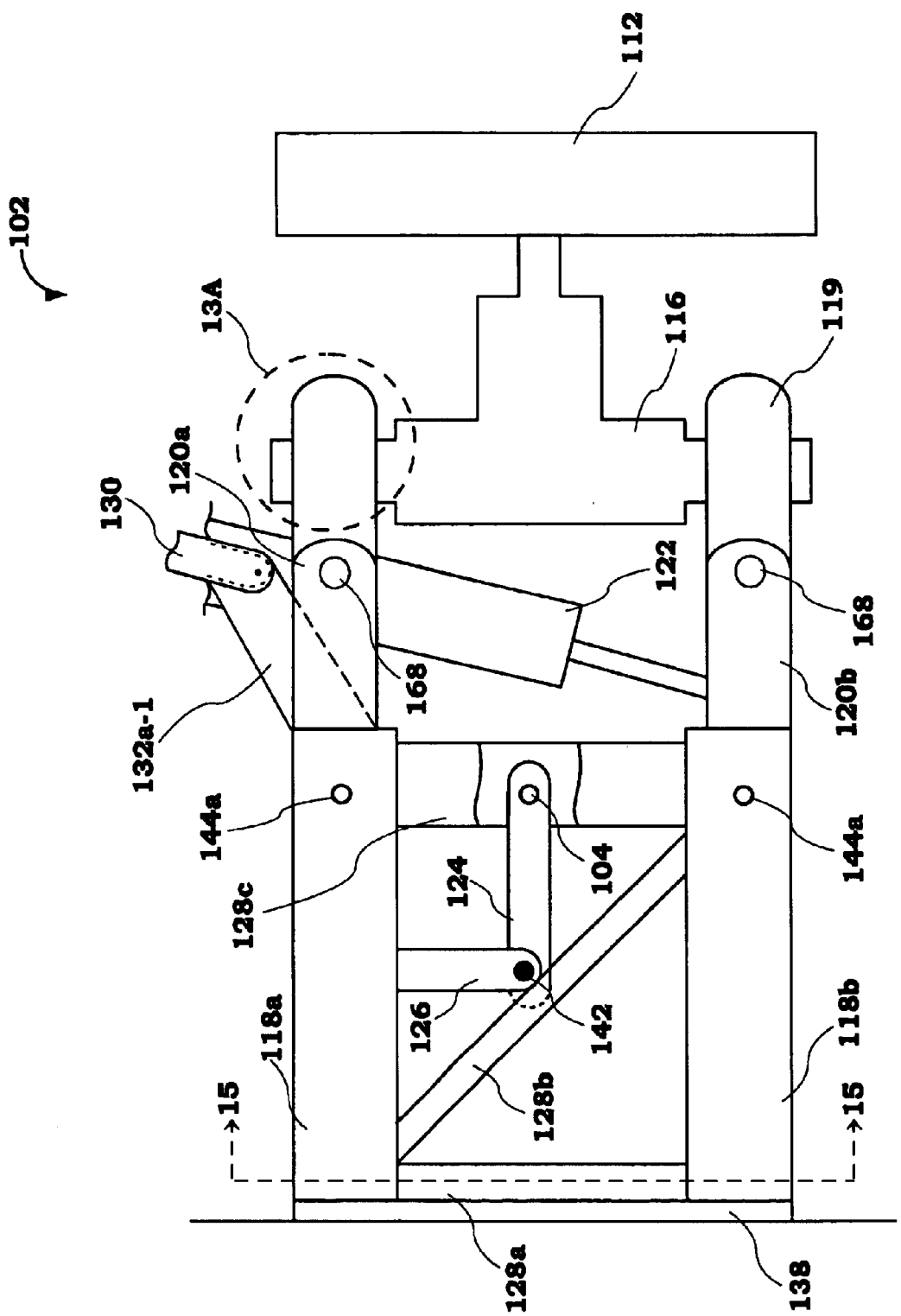
FIG. 4 is a side view of a suspension in accordance with one embodiment of the present invention.
Figure 9A:
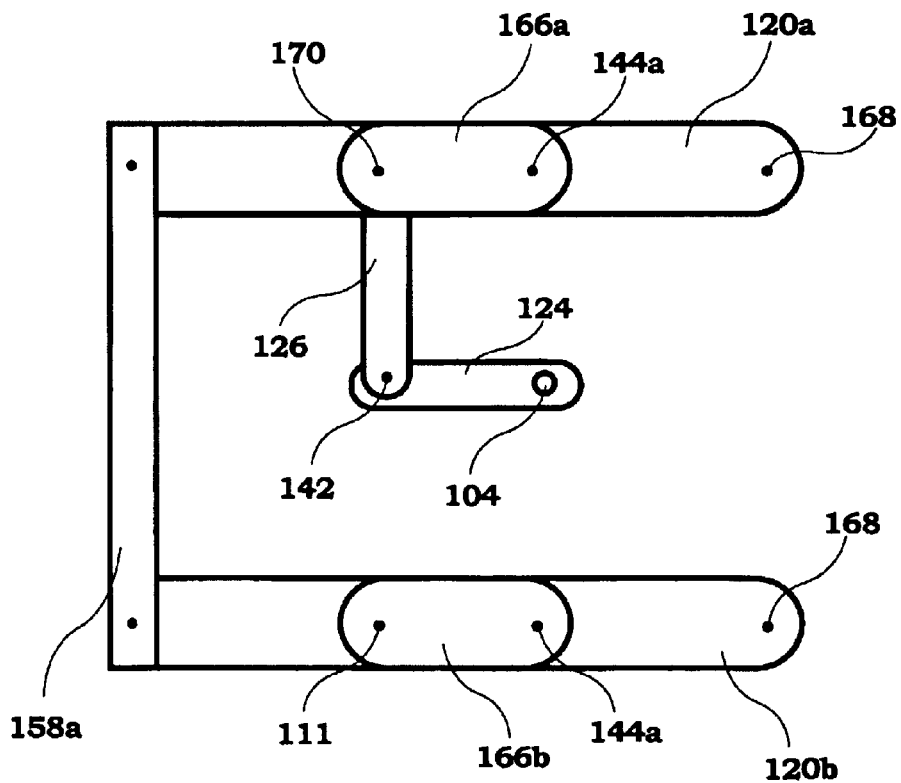
FIG. 9A shows a suspension in a neutral position, wherein the suspension is shown at a midpoint in an adjustment range of the suspension.

FIG. 3 is a top view of the suspension 102 in accordance with one embodiment of the present invention. The suspension 102 connects to the frame 138 of the vehicle 200 with structure arms 118*a–d*. The structure arms 118*a–d* are rigidly attached to the frame 138 using any suitable technique known in the art, e.g., welding and threaded fasteners. Alternatively, the structure arms 118*a–d* and the frame 138 may be machined from a solid block of material, thereby forming a single unit. In FIG. 3, the structure arms 118*a* and 118*c* are shown connecting the suspension 102 to the frame 138, while FIG. 4 shows the structure arm 118*b* oriented below the structure arm 118*a*. It should be noted that the structure arm 118*d* (see FIG. 15) is oriented below the structure arm 118*c* in the same manner as the structure arm 118*b* is oriented below the structure arm 118*a*. The suspension 102 attaches to the structure arms 118*a–d* through pin connections 144*a*. The pin connections 144*a* connect the structure arms 118*a–d* to outer control links 166*a–d* of the suspension 102. The pin connections 144*a* may be any type of suitable pin connection known in the art that allows rotational connection between the structure arms 118*a–d* and the outer control links 166*a–d*. Each structure arm 118*a–d* connects to a control link 166*a–d* such that the structure arm 118*a* connects to the outer control link 166*a* and the structure arm 118*b* connects to the outer control link 166*b*. Also, the structure arm 118*c* connects to the outer control link 166*c* and the structure arm 118*d* connects to the outer control link 166*d*. Thus, the outer control links 166*a–d* have the same orientation as the structure arms 118*a–d* in that the outer control link 166*b* is oriented beneath the outer control link 166*a* as shown in FIG. 9A and the outer control link 166*d* (see FIG. 15) is oriented beneath the outer control link 166*c*.

As will be discussed with reference to FIGS. 9A–9C, the outer control links 166*a–d* and inner control arms 132*a–d* aid the suspension 102 in decreasing and increasing the ride height H of the vehicle 200. The outer control links 166*a–d* and the inner control arms 132*a–d* also control the geometry of the suspension 102 as the suspension 102 adjusts the ride height of the vehicle 200. Furthermore, the outer control links 166*a–d* and the inner control arms 132*a–d* aid the suspension 102 in resisting fore and aft lateral forces imparted onto the suspension 102 during normal operation.

The outer control links 166*a* and 166*c* and the inner control arms 132*a* and 132*b* also connect to the primary links 120*a* and 120*c* of the suspension 102 with pin connection 170. The pin connection 170 may be any type of suitable pin connection known in the art that allows rotational connection between the primary links 120*a* and 120*c* and the outer control links 166*a* and 166*c* and the inner control arms 132*a* and 132*b*. The outer control links 166*b* and 166*d* connect with the primary links 120*b* and 120*d* with pin connections 111 as shown in FIG. 9A. The pin connections 111 may be any type of pin connection known in the art that allows rotational connection between the primary links 120*b* and 120*d* and the outer control links 166*b* and 166*d*. The suspension 102 includes four primary links 120*a–d*, as shown in FIG. 3 and FIG. 4. The primary links 120*a–d* are oriented in the same manner as the outer control links 166*a–d*, such that the primary link 120*b* is located beneath the primary link 120*a* and the primary link 120*d* (see FIG. 15) is located beneath the primary link 120*c*. The primary links 120*a–d* connect to tire 112 via spindle yokes 119 and the tire spindle 116. The primary links 120*a–d* connect to the spindle yoke 119 through pin connections 168. The pin connections 168 may be any type of interface known in the art that allows rotational connection between the primary links 120*a–d* and the spindle yoke 119. As will be described with reference to FIGS. 9A–9C, the primary links 120*a–d* move in an upward direction to decrease the ride height H or in a downward direction to increase the ride height H. In addition, the interaction of the rotation links 156a and 156b, the translation links 158a and 158b and the primary links 120a–d will be described with reference to FIGS. 9A–9C.

Referring back to FIG. 3, spindle yoke 119 and tire spindle 116 on which the tire 112 is mounted is attached to the suspension 102. The tire 112 may be mounted on the tire spindle 116 using a wheel and hub assembly, as is well known in the art. The primary links 120a and 120c also connect to inner control arms 132a and 132b with the pin connection 170. The inner control arms 132a–d adjust the suspension 102 along with the primary links 120a–d such that the ride height H of the vehicle 200 may be increased or decreased, as will be fully detailed in FIG. 5. The inner control arms 132a–d are oriented in the suspension 102 in the same manner as the outer control links 166a and 166c on the primary links 120a and 120c. The inner control arm 132c is oriented below the inner control arm 132a and the inner control arm 132d is oriented below the inner control arm 132b. However, the inner control arms 132a–d are on a side of the primary links 120a–d opposing the outer control links 166a–d, as shown with reference to FIG. 3. The inner control arms 132a and 132b hold a shock absorber 122 with pin connections 148. The pin connections 148 may be any suitable type of connection known in the art which facilitates rotational connection between the inner control arms 132a and 132b and the shock absorber 122. The shock absorber 122 dampens spring oscillations as the torsion spring 104 absorbs impacts of the vehicle 200 when the vehicle 200 hits irregularities (e.g., potholes, speed bumps, etc.) on the surface 204.

The inner control arms 132a and 132b also connect to an attachment link 126 with the pin connection 170. As will be described with reference to FIG. 5, the attachment link 126 pushes up on the inner control arms 132a and 132b to support the weight of the vehicle 200 and to decrease the ride height H of vehicle 200 and pulls down on the inner control arms 132a and 132b to increase the ride height H of the vehicle 200. The attachment link 126 connects to the torsion arm 124 with a pin connection 142. The pin connection 142 may be any suitable type of connection known in the art which facilitates rotational connection between the torsion arm 124 and the attachment link 126. The torsion arm 124 is supported by the torsion spring 104 on an end opposite the attachment link 126.

The torsion arm 124 is partially enclosed with substructure enclosure 128c. As shown in FIG. 3, the substructure enclosure 128c partially encloses the torsion arm 124 such that the torsion arm 124 is enclosed on three sides with a fourth side remaining open to allow connection between the torsion arm 124 and the attachment link 126. The substructure enclosure 128c connects to the frame 138 of the vehicle 200 via side plates 128b and a substructure 128a. Additionally, as depicted in FIG. 3 inner control arms 132a and 132b are attached to substructure enclosure 128c by pin connections 144b. The pin connections 144b may be any suitable type of connection known in the art that facilitates rotational connection between the inner control arms 132a–d and the substructure enclosure 128c. The substructure enclosure 128c may be rigidly attached to the side plates 128b and the side plates 128b may be rigidly attached to the substructure 128a. The substructure 128a may also be rigidly attached to the frame 138. The rigid attachments between the substructure enclosure 128c and the side plates 128b, the side plates 128b and the substructure 128a and the substructure 128a and the frame 138 may be formed by welding, threaded fasteners or any other suitable technique. Alternatively, the substructure enclosure 128c, the side plates 128b, the substructure 128a and the frame 138 may be machined from a solid block of material, thereby forming a single unit.

FIG. 4 is a side view of the suspension 102 in accordance with one embodiment of the present invention. The suspension 102 includes the structure arms 118a–d which are connected to the frame 138 of the vehicle 200. The primary links 120a–d are disposed inside the structure arms 118a–d such that the structure arms 118a–d partially cover the primary links 120a–d.

Also shown in FIG. 4 is the torsion arm 124 in connection with the attachment link 126 of the suspension 102. As will be further described with reference to FIGS. 9A–9C, the torsion arm 124 pushes up on the attachment link 126 to support the weight of the vehicle 200 and to decrease the ride height H of the vehicle 200 and pulls down on the attachment link 126 to increase the ride height H of the vehicle 200. In addition, along with the outer control links 166a–d, the torsion arm 124 helps the suspension 102 resist fore and aft lateral forces during normal operation of the vehicle 200. The torsion arm 124 is held in the suspension 102 with the attachment link 126 supporting one end as shown and the torsion spring 104 supporting the torsion arm 124 on an end opposite the attachment link 126. The torsion arm 124 resides within the substructure enclosure 128c. In FIG. 4, the substructure enclosure 128c is cut-away in order to show the configuration of the torsion arm 124 within the substructure enclosure 128c. The substructure enclosure 128c connects with the side plates 128b as discussed above. In this embodiment, the side plates 128b angle in a downward direction from the substructure 128a to the substructure enclosure 128c. However, it should be noted that side plates 128b may have any orientation that allows the side plates 128b to connect the substructure 128a with the substructure enclosure 128c.

The suspension 102 also includes the shock absorber 122. The shock absorber 122 connects to the suspension 102 with the inner control arms 132a and 132b and an encasing 130 with the pin connections 148. The encasing 130 encloses a top portion of the shock absorber 122 such that the shock absorber 122 connects to the suspension 102 and the vehicle 200 via the encasing 130, as will be described in further detail with reference to FIG. 6. The inner control arms 132a and 132b have extensions 132a-1 and 132b-1, which rotationally engage with the shock absorber 122 via pin connections 148, as will be described in more detail with reference to FIG. 5.

Figure 5:
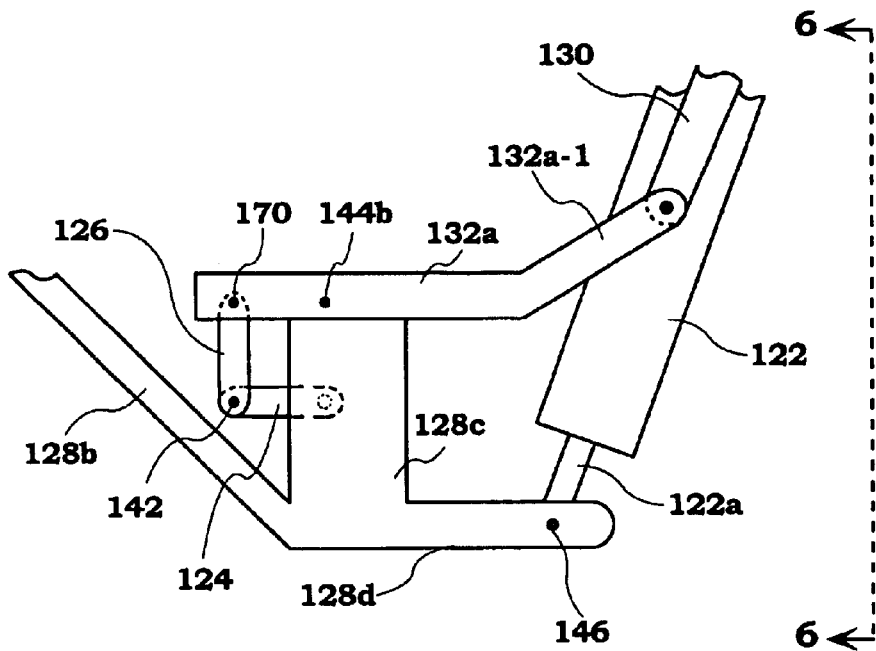
FIG. 5 shows an orientation of a shock absorber within a suspension in accordance with one embodiment of the present invention.

FIG. 5 shows the orientation of the shock absorber 122 within the suspension 102 in accordance with one embodiment of the present invention. As the vehicle 200 travels along the surface 204, the vehicle 200 will encounter road irregularities (e.g., potholes, speed bumps, etc.), which the suspension 102 will dampen to insulate occupants within the vehicle 200 from the jarring effects of such irregularities. The shock absorber 122 allows the suspension 102 to dampen the effect of road irregularities on the vehicle 200. The shock absorber 122 connects to the suspension 102 via the inner control arms 132a and 132b and a substructure extension 128d. The inner control arms 132a and 132b include extensions 132a-1 and 132b-1 (not visible in FIG. 5) which connect to the encasing 130. The extensions 132a-1 and 132b-1 connect to the encasing 130 with the pin connections 148. The shock absorber 122 also connects to the substructure extension 128d. The substructure extension 128d connects with the shock absorber 122 on piston shaft 122a of the shock absorber 122 with pin connection 146. The pin connection 146 may be any type of suitable connection known in the art which facilitates rotational connection between the substructure extension 128d and the shock absorber 122. The substructure extension 128d is rigidly attached to the substructure enclosure 128c in the same manner that the substructure enclosure 128c is rigidly attached to the side plates 128b. The shock absorber 122 connects to the suspension 102 with the encasing 130 as described with reference to FIG. 6.

Referring back to FIG. 5, also shown is the attachment link 126 connecting to the inner control arm 132a. The attachment link 126 is connected to the inner control arm 132a with the pin connection 170, as shown in FIG. 3. Thus, as the attachment link 126 is moved by the torsion arm 124, the attachment link 126 will move the inner control arm 132a. It should be noted that the attachment link 126 also connects to the inner control arm 132b in the same manner as the attachment link 126 connects to the inner control arm 132a. Therefore, as the attachment link 126 is moved by the torsion arm 124, the attachment link 126 simultaneously moves the inner control arms 132a and 132b.

Figure 6:
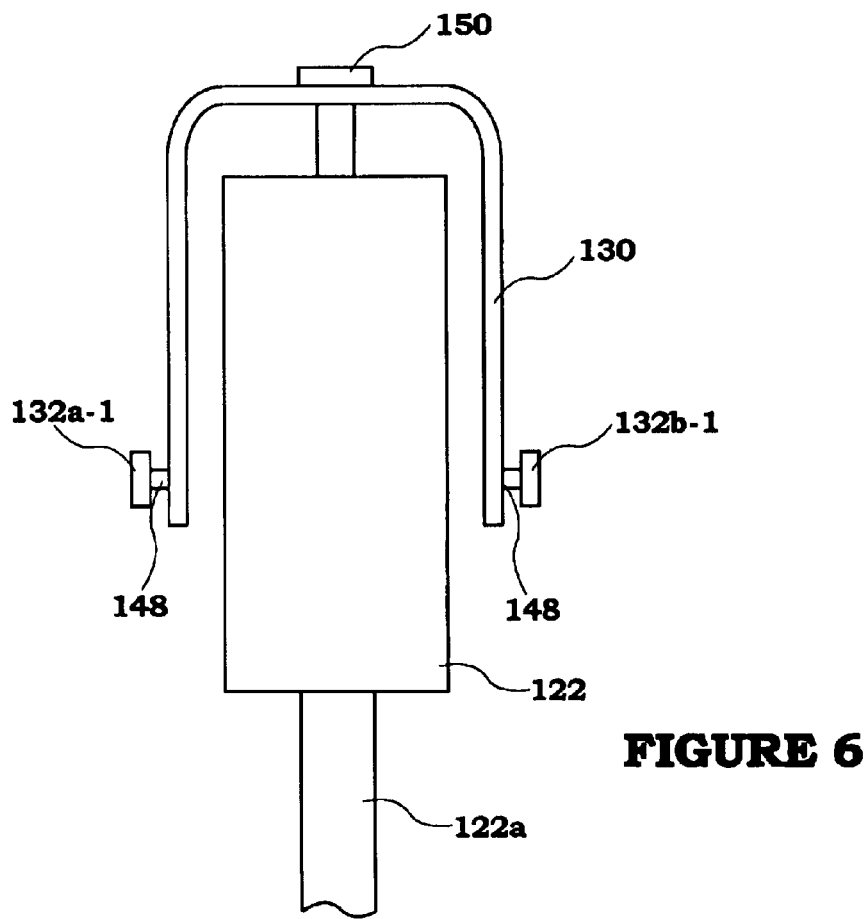
FIG. 6 shows an encasing holding a shock absorber in accordance with one embodiment of the present invention.

FIG. 6 shows the encasing 130 holding the shock absorber 122 in accordance with one embodiment of the present invention. The enclosure 130 is a U-shaped bracket that allows any suitable type of shock absorber known in the art to fit into the suspension 102. The shock absorber 122 connects with the encasing 130 with a threaded fastener 150. Thus, the shock absorber 122 connects to the suspension 102 via the threaded fastener 150.

FIG. 7 illustrates a suspension adjustment assembly 107 that controls the adjustment of the suspension 102 in accordance with one embodiment of the present invention. The suspension adjustment assembly 107 includes the torsion spring 104 connected to a worm gear 172 and the control mechanism 106. The control mechanism 106 controls the setting of the position of the anchor 117 (see FIGS. 8A and 8B) of the torsion spring 104 with a motor 176 and a gear reducer 174. The motor 176 is coupled to a gear reducer 174 and rotates the gear reducer 174 when a person or microprocessor within the vehicle 200 engages the control mechanism 106 (see FIG. 7). The gear reducer 174 increases the available torque output from the motor 176 while decreasing an output speed of the motor 176 to incrementally move the worm gear 172. The motor 176 may be any suitable motor known in the art that allows rotational motion, e.g., electric motors and hydraulic motors. The gear reducer 174 may be a spur gear, a planetary gear, or any other suitable gear reducer. The gear reducer 174 is attached with the worm 178 and the worm 178 couples with the worm gear 172. The worm gear 172 is rigidly attached to an end of the torsion spring 104 opposite the torsion arm 124. The worm gear 172 is rigidly attached to the torsion spring 104 using any suitable technique known in the art, e.g., welding, cast molding, or a mechanical fastener such as a pin or a threaded fastener. As the gear reducer 174 is rotated by the motor 176, the gear reducer 174 rotates the worm gear 172 via worm 178, as described with reference to FIGS. 8A and 8B.

A microprocessor 99 (see FIG. 2A) suitably disposed within the vehicle 200 may be used to position the suspension 102 to adjust the ride height H of the vehicle. The microprocessor monitors dynamic parameters of the vehicle 200 and adjusts the suspension 102 in response to changes of the dynamic parameters by sending appropriate control signals to control mechanism 106. The microprocessor monitors the dynamic parameters of the vehicle 200 by receiving inputs from devices 98a and 98b (see FIG. 1A) capable of measuring dynamic parameters of the vehicle, e.g., accelerometers and the speedometer. The accelerometers may be placed near the center of gravity of the vehicle, in the trunk or underneath the vehicle, in fore and aft regions of the vehicle, at the four corners of the vehicle, or any other suitable region within the vehicle.

The dynamic parameters that may be measured include the speed of the vehicle, the pitch and body roll of the vehicle when the vehicle is braking or cornering, and the lateral acceleration of the vehicle. By way of example, when the microprocessor senses that the speed of the vehicle is increasing or that the vehicle is experiencing increased pitch or body roll, the microprocessor lowers the ride height of the vehicle to provide the vehicle with more stability.

Figure 8A:
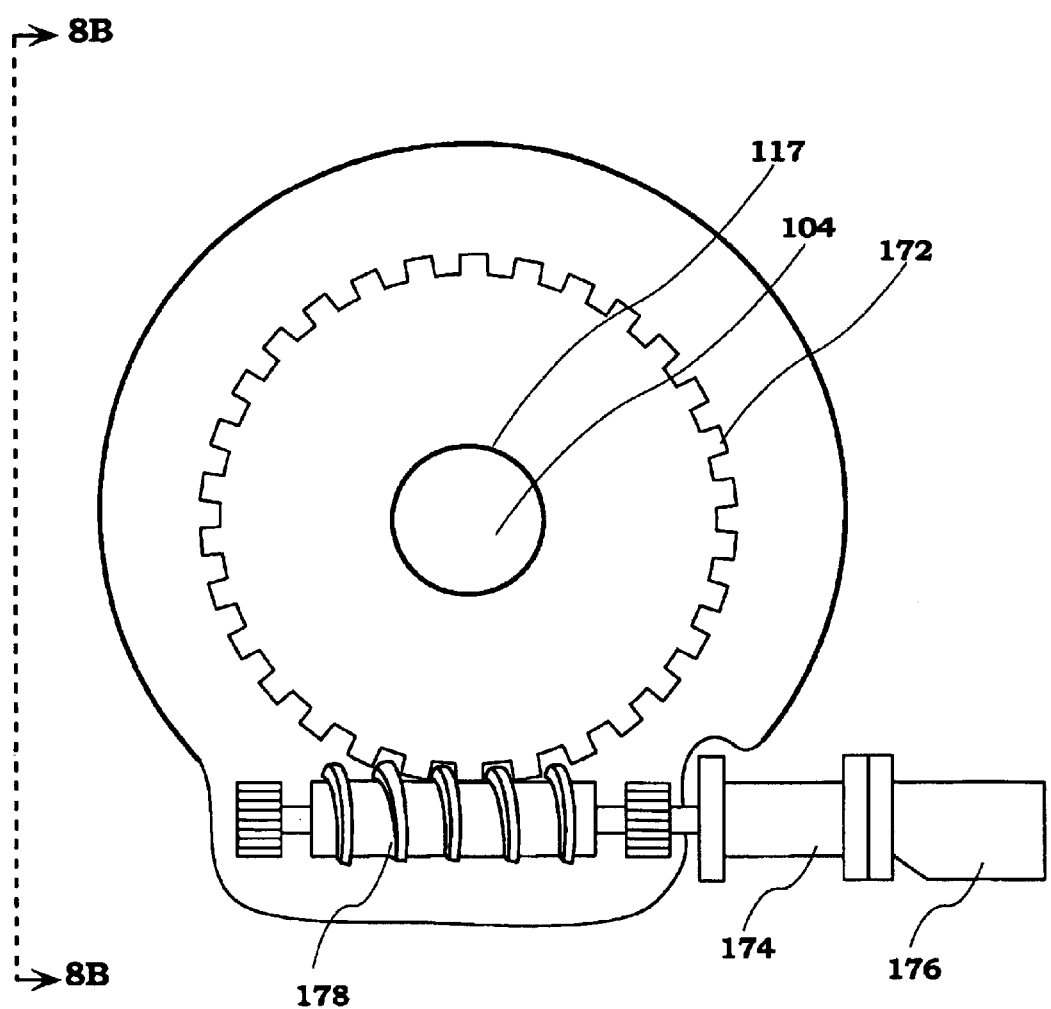
FIG. 8A illustrates a worm engaging a worm gear in accordance with one embodiment of the present invention.

FIG. 8A illustrates the worm 178 engaging the worm gear 172 in accordance with one embodiment of the present invention. As the gear reducer 174 turns the worm 178, the worm 178 rotates the worm gear 172 to rotate the torsion spring 104. The worm gear 172 rotates the torsion spring 104 at the anchor point 117. As the worm gear 172 rotates the torsion spring 104, the torsion spring 104 rotates the torsion arm 124 to adjust the ride height, as will be described in more detail with reference to FIGS. 9A–9C.

Figure 8B:
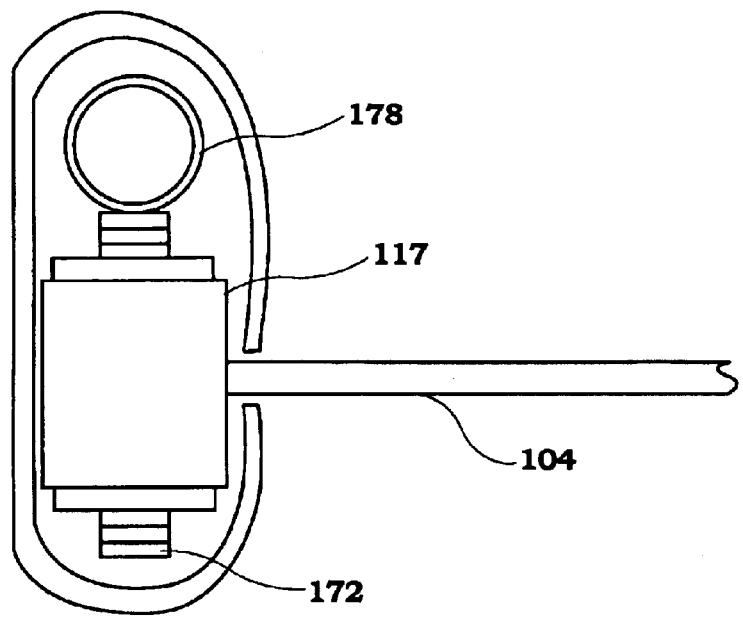
FIG. 8B is a side view of FIG. 8A.

FIG. 8B is a side view of FIG. 8A in accordance with one embodiment of the present invention. As the gear reducer 174 rotates the worm 178, the worm 178 rotates the worm gear 172. As the worm gear 172 rotates, the worm gear 172 rotates the torsion spring 104. Referring back to FIG. 7, the torsion spring 104 is rigidly attached to the torsion arm 124 with a spline 115 or other suitable attachment. The torsion spring 104 rotates the torsion arm 124 with the spline 115 as described below with reference to FIGS. 9A–9C.

Figure 9B:
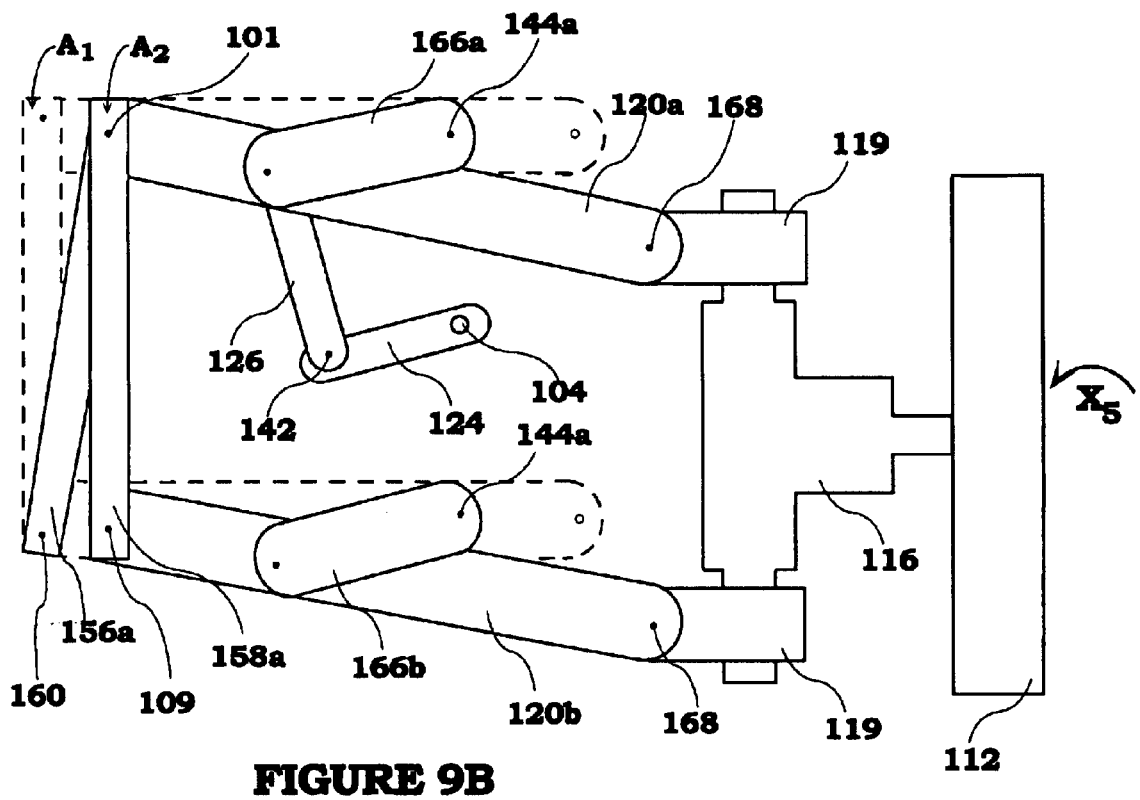
FIG. 9B shows a suspension adjusted in order to increase a ride height of the vehicle in accordance with one embodiment of the present invention.
Figure 9C:
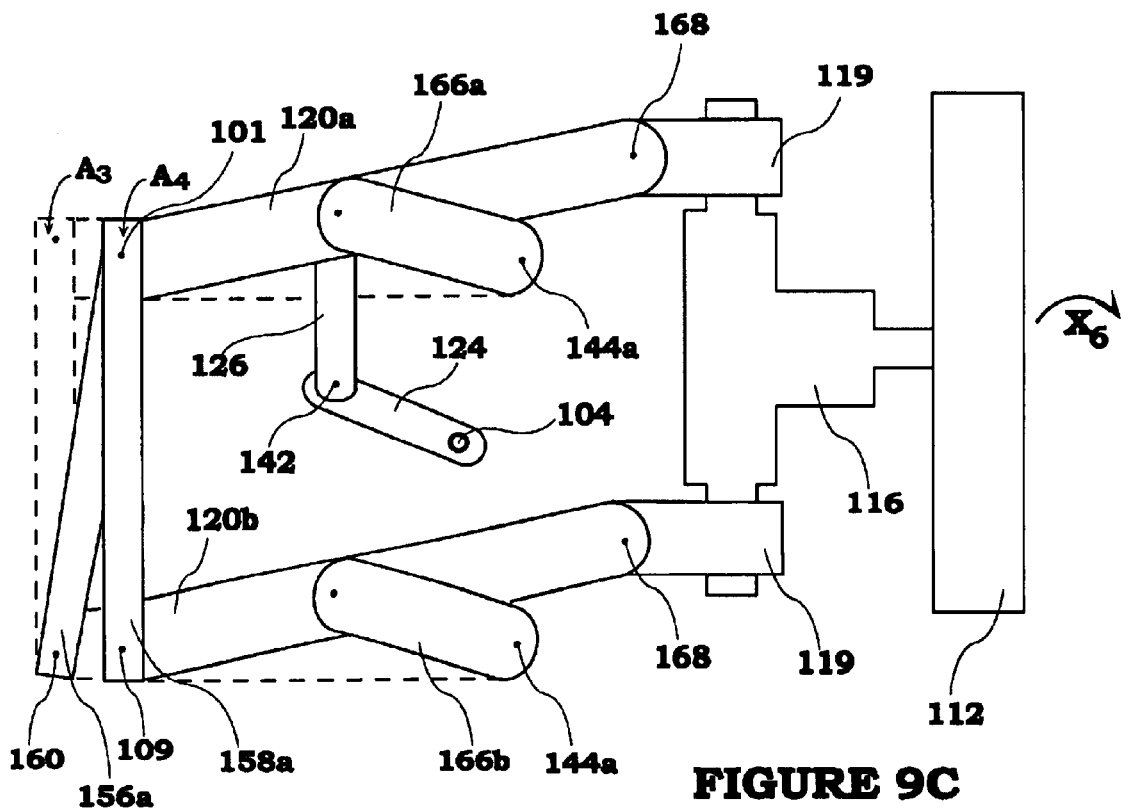
FIG. 9C depicts a suspension adjusted in order to decrease a ride height of a vehicle in accordance with one embodiment of the present invention.

FIGS. 9A–9C illustrate the adjusting of the suspension 102 to increase and decrease the ride height H of the vehicle 200 in accordance with one embodiment of the present invention. FIG. 9A shows the suspension 102 at a midpoint in an adjustment range of the suspension. The suspension 102 adjusts the ride height H of the vehicle 200 by changing the orientation of the primary links 120a–d with the torsion arm 124. FIGS. 9A–9C illustrate the motions of the primary links 120a and 120b that take place when the ride height H of the vehicle 200 is adjusted. As will be discussed, a change in the orientation of the primary links 120a and 120c is translated to primary links 120b and 120d, respectively, thereby causing the vehicle height to change. It should be noted that the primary links 120c and 120d move the same way that the primary links 120a and 120b move. That is, as will be described in more detail below, as the primary links 120a and 120b move in a downward direction, the primary links 120c and 120d move in the same downward direction along with the primary links 120a and 120b. Similarly, as the primary links 120a and 120b move in an upward direction, the primary links 120c and 120d also move in the same upward direction along with the primary links 120a and 120b.

FIG. 9B shows the suspension 102 adjusted to increase the ride height H of the vehicle 200 in accordance with one embodiment of the present invention. When a person or a microprocessor within the vehicle engages control mechanism 106 (see FIG. 7) to increase the ride height H of the vehicle 200, the control mechanism rotates the worm gear 172 (see FIG. 7), which in turn rotates the torsion spring 104 in a direction $X_5$ as shown in FIG. 9B. As the torsion spring 104 rotates in the direction $X_5$, the torsion arm 124 will also rotate in the direction $X_5$. When the torsion arm 124 rotates in the direction $X_5$, the torsion arm 124 pulls the attachment link 126 in a downward direction. As described above, the attachment link 126 is connected to the primary link 120a via the inner control arm 132a. Thus, attachment link 126 pulls the primary link 120a down as the attachment link 126 is pulled down by the torsion arm 124. The primary link 120a is rotatably connected to the translation link 158a and the rotation link 156a with a pin connection 101. Thus, as the primary link 120a moves in a downward direction along with the attachment link 126, the primary link 120a will move the translation link 158a and the rotation link 156a from a position $A_1$ indicated by the broken lines to a position $A_2$. The rotation link 156a rotates about pin connection 160 and therefore the end of the rotation link 156a that is in rotational engagement with the pin connection 160 does not translate.

The translation link 158a is also connected to the primary link 120b with a pin connection 109. The translation link 158a is connected to the primary link 120a at the end defined by the pin connection 101 and is connected to the primary link 120b at an end opposite to the end to which the primary link 120a is attached, the end being defined by the pin connection 109. Hence, as the primary link 120a moves in a downward direction, the primary link 120a also causes the primary link 120b to move in a downward direction through the translation link 158a. As the primary links 120a and 120b move in a downward direction, the ride height H of the vehicle 200 increases, as depicted in FIG. 1A.

FIG. 9B also shows the outer control links 166a and 166b rotating about the pin connections 144a in a downward direction as the primary links 120a and 120b move in a downward direction. As described above, the outer control links 166a and 166b connect the suspension 102 to the frame 138 of the vehicle 200 at the pin connections 144a. Thus, as the primary links 120a and 120b move in a downward direction, an end of the outer control links 166a and 166b defined by the location of the pin connections 144a remains stationary as a result of the connection to the frame of the vehicle 200. The outer control links 166c and 166d move in unison with the outer control links 166a and 166b. As the outer control links 166a and 166b move in a downward direction, the outer control links 166c and 166d also move in the same downward direction.

FIG. 9C depicts the suspension 102 decreasing the ride height H of the vehicle 200 in accordance with one embodiment of the present invention. When a person or a microprocessor within the vehicle engages control mechanism 106 (see FIG. 7) to decrease the ride height H of the vehicle 200, the control mechanism rotates the worm gear 172 (see FIG. 7), which in turn rotates the torsion spring 104 in a direction $X_6$ as shown in FIG. 9C. As the torsion spring 104 rotates in the direction $X_6$, the torsion arm 124 will also rotate in the direction $X_6$. When the torsion arm 124 rotates in the direction $X_6$, the torsion arm 124 pushes the attachment link 126 in an upward direction. As described above, the attachment link 126 is connected to the primary link 120a via the inner control arm 132a. Thus, attachment link 126 will push the primary link 120a up as the attachment link 126 is pushed up by the torsion arm 124. When the primary link 120a moves in an upward direction along with the attachment link 126, the primary link 120a will move the translation link 158a and the rotation link 156a from a position $A_3$ indicated by the broken lines to a position $A_4$. The primary link 120a also causes the primary link 120b to move in an upward direction through the translation link 158a. As the primary links 120a and 120b move in an upward direction, the ride height H of the vehicle 200 decreases, as depicted in FIG. 1B.

FIG. 9C also shows the outer control links 166a and 166b rotating about the pin connection 144a in an upward direction as the primary links 120a and 120b move in an upward direction. As described above, the outer control links 166a and 166b connect the suspension 102 to the frame 138 of the vehicle 200 at the pin connections 144a. Thus, as the primary links 120a and 120b move in an upward direction, an end of the outer control links 166a and 166b defined by the location of the pin connections 144a remains stationary as a result of the connection to the vehicle 200. It should also be noted that the outer control links 166c and 166d move in unison with the outer control links 166a and 166b. As the outer control links 166a and 166b move in the upward direction, the outer control links 166c and 166d also move in the same upward direction.

Figure 10C:
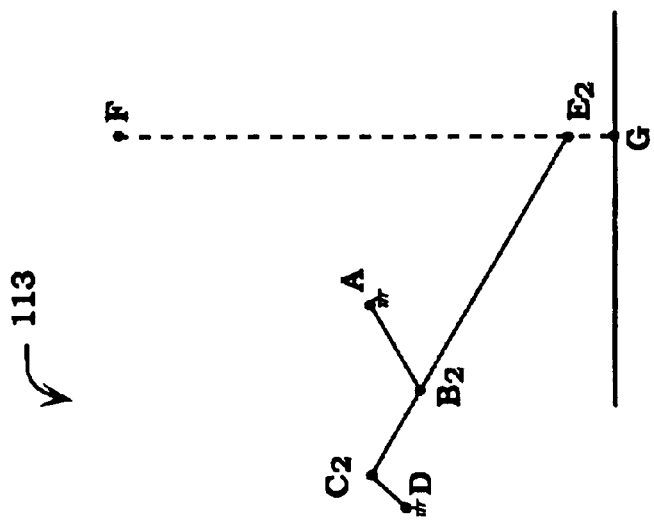
FIG. 10C illustrates a Scott-Russell linkage moving in a downward direction in accordance with one embodiment of the present invention.
Figure 10B:
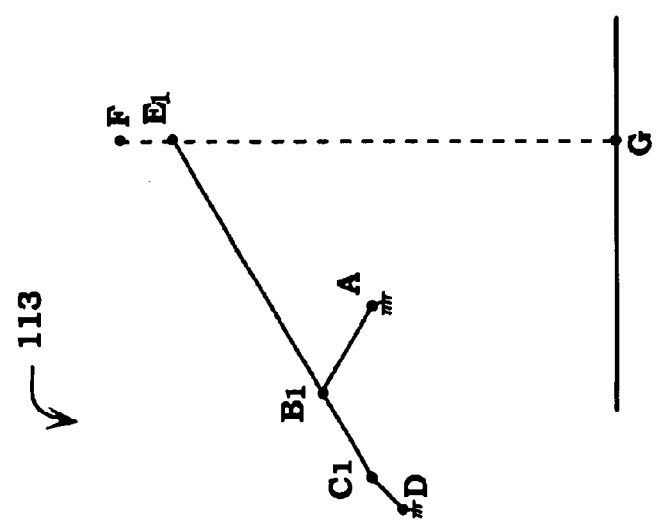
FIG. 10B illustrates a Scott-Russell linkage moving in an upward direction in accordance with one embodiment of the present invention.
Figure 10A:
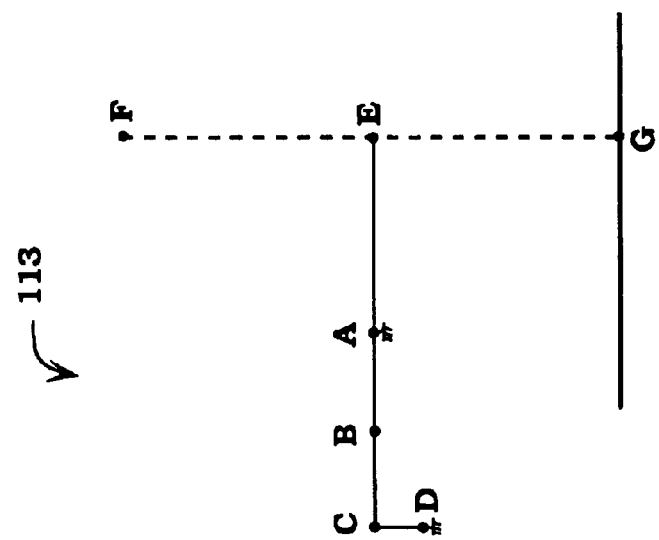
FIG. 10A shows a Scott-Russell linkage in accordance with one embodiment of the present invention.

It should be noted that as the suspension 102 adjusts the ride height H of the vehicle 200, the camber angle and the castor of the tire 112 remain unchanged. The outer control links 166a–d, the inner control arms 132a–d and the primary links 120a–d form a Scott-Russell linkage arrangement as shown in FIGS. 10A–C. Additional details regarding Scott-Russell linkage arrangements are set forth in U.S. Pat. No. 3,711,113, the disclosure of which is incorporated herein by reference.

FIGS. 10A–C illustrate how the primary links, the inner control arms, the translation links, the rotation links and outer control links of the suspension of the present invention form a Scott-Russell linkage. FIG. 10A shows a Scott-Russell linkage 113 in a neutral position. The Scott-Russell linkage 113 includes points A, B, C, D and E which define a link AB, a link DC and a link CE. The link AB corresponds to the inner control arms 132a–d and the outer control links 166a–d of the suspension 102, the link DC corresponds to the translation links 158a and 158b and the rotation links 156a and 156b and the link CE corresponds to the primary links 120a–d of the suspension 102. The point E of the Scott-Russell linkage 113 corresponds to the attachment point of the primary links 120a–d with the spindle yokes 119 of the suspension 102. Thus, the motion of the Scott-Russell linkage 113, as will be described with reference to FIGS. 10B and 10C, is the same as the motion of the suspension 102, as described above with reference to FIGS. 9B and 9C. Also, the path followed by the point E as the Scott-Russell linkage 113 moves in an upward and a downward direction represents the path followed by the tire 112 in the suspension 102 as the suspension 102 increases or decreases the ride height H of the vehicle 200.

The points B, C and E are free to move, whereas the points A and D are fixed. The lengths of the link AB and the link CE are selected to satisfy the Scott-Russell relationship (AB/BC=BC/BE). When the lengths of the link AB and the link CE satisfy the Scott-Russell relationship, the point E will remain along a path defined by FG, which is perpendicular to the surface 204, when the Scott-Russell linkage 113 is adjusted. The link DC controls the position of the point C as required by the Scott-Russell relationship and as described in the above-mentioned U.S. Pat. No. 3,711,113.

FIG. 10B illustrates the Scott-Russell linkage 113 moving in an upward direction. It should be noted that the upward motion of the Scott-Russell linkage 113 is the same as the upward motion of the suspension 102 as the suspension 102 decreases the ride height H of the vehicle 200. The points C, B and E move to points $C_1$, $B_1$, and $E_1$ as shown. When the suspension 102 decreases the ride height H of the vehicle 200, as shown in FIG. 9C, the motion of the outer control links 166a and 166b is the same as the motion of the link $AB_1$ in FIG. 10B. Also, as the suspension 102 adjusts to decrease the ride height H of the vehicle 200, the motion of the primary links 120a and 120b is the same as the link $C_1E_1$ and the motion of the tire 112 is the same as the point $E_1$ in FIG. 10B. The point $E_1$ remains along the path defined by FG and perpendicular to the surface 204. Thus, as the tire 112 moves along the same path as the point $E_1$ when the suspension decreases the ride height H of the vehicle 200, the tire 112 will remain perpendicular to the surface 204, thus avoiding any changes in camber angle.

FIG. 10C illustrates the Scott-Russell linkage 113 moving in a downward direction. It should be noted that the downward motion of the Scott-Russell linkage 113 is the same as the downward motion of the suspension 102 as the suspension increases the ride height H of the vehicle 200. The points C, B and E move to points $C_2$, $B_2$ and $E_2$ as shown. When the suspension 102 increases the ride height H of the vehicle 200, as shown in FIG. 9B, the motion of the outer control links 166a and 166b is the same as the motion of the link $AB_2$ in FIG. 10C. Also, as the suspension 102 increases the ride height H of the vehicle 200, the motion of the primary links 120a and 120b is the same as the link $C_2E_2$ and the path of the tire 112 is the same as that of the point $E_2$, which moves along path FG as shown in FIG. 10C. The point $E_2$ remains along the path defined by FG and perpendicular to the surface 204. Thus, as the tire 112 moves along the same path as the point $E_2$ when the suspension increases the ride height H of the vehicle 200, the tire 112 will remain perpendicular to the surface 204, again avoiding any changes in camber angle. In one embodiment, the four primary links 120a–d and the four outer control links 166a–d of suspension system of the present invention satisfy the Scott-Russell relationship. Thus, in this embodiment, the suspension system uses four Scott-Russell linkages working in unison to support the weight of the vehicle 200 and to adjust the ride height H of the vehicle 200.

Figure 11:
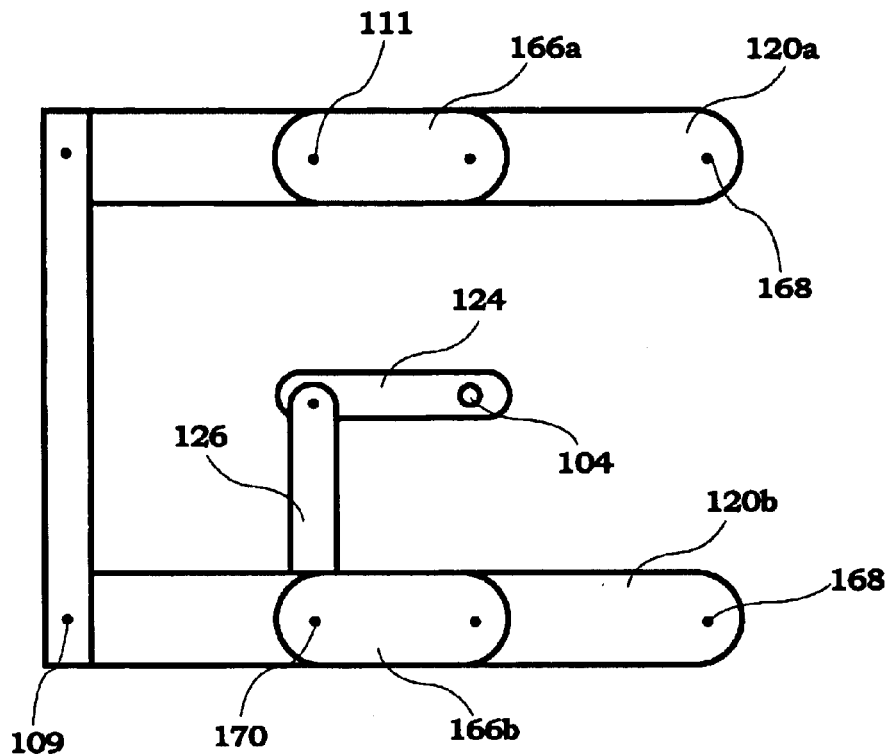
FIG. 11 shows an alternative embodiment of a suspension in accordance with one embodiment of the present invention.

FIG. 11 shows an alternative embodiment of the suspension 102. In the orientation shown in FIG. 11, the attachment link 126 connects to the lower primary link 120b as opposed to the upper primary link 120a. As such, when the ride height H is decreased, the attachment link 126 will pull up on the primary link 120b as opposed to pushing up on the primary link 120a, as described above with reference to FIG. 9C. Also, using this configuration, as the ride height H is increased, the attachment link 126 will push down on the primary link 120b, as opposed to pulling down on the primary link 120a, as described above with reference to FIG. 9B.

Figure 12:
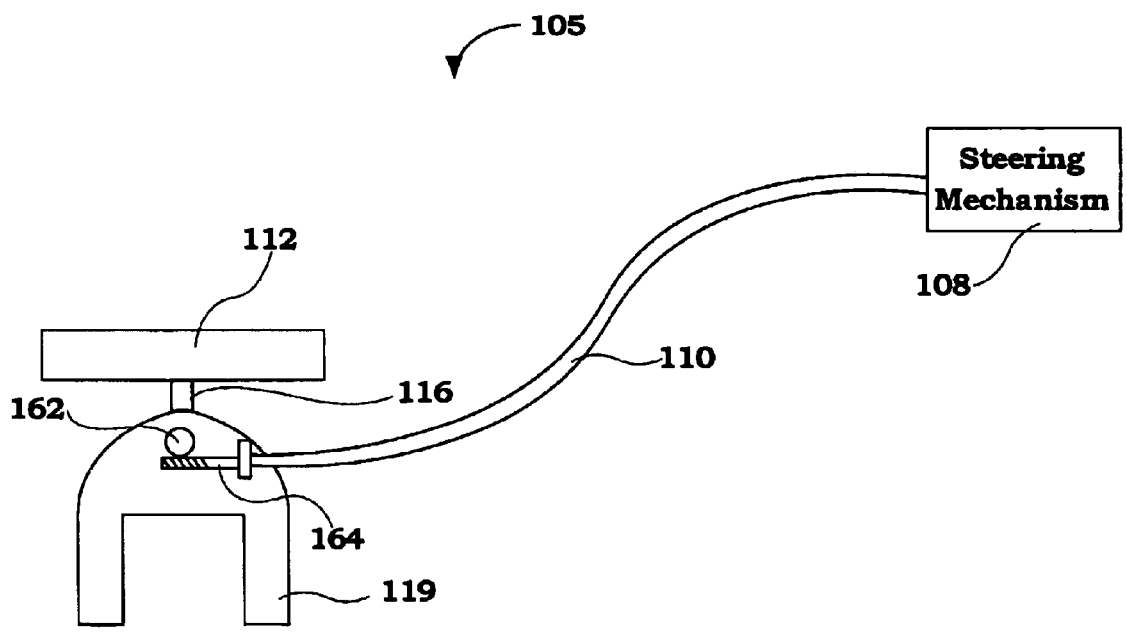
FIG. 12 illustrates a steering assembly used to turn a tire in accordance with one embodiment of the present invention.

FIG. 12 illustrates a steering assembly 105 used to turn the tire 112 in accordance with one embodiment of the invention. The steering assembly 105 includes the steering mechanism 108, the flex cable 110, a worm gear 162 and the worm 164. The steering mechanism 108 may be any suitable steering gearbox such as, for example, recirculating ball or rack and pinion. The steering mechanism 108 connects with the flex cable 110 and the tire spindle 116 of the suspension 102 connects with the flex cable 110. The flex cable 110 may be a flexible rotary cable, a flexible push/pull cable (see FIG. 14), or other suitable flexible cable. The flex cable 110 connects with the worm 164 to control the turning of the tire 112, as will be described below with reference to FIGS. 13A–13C. As the suspension 102 increases or decreases the ride height H of the vehicle 200, the flexibility of the flex cable 110 allows the flex cable 110 to retain a steering ratio used to turn the tire 112 as the tire 112 moves in an upward or downward direction. Thus, the steering ratio used to turn the tire 112 for the vehicle 200 when the ride height H is decreased will be the same as the steering ratio used to turn the tire 112 when the ride height H is increased for the vehicle 200. As such, the use of the flex cable 110 avoids the "bump steer" problem associated with prior art steering assemblies used with adjustable suspensions.

Figure 13A:
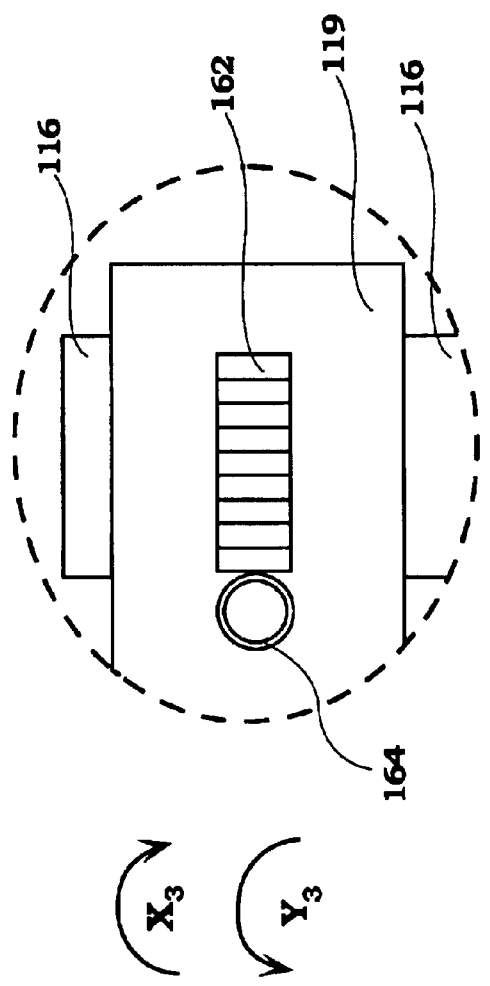
FIG. 13A shows the interaction of a worm with a worm gear within a spindle 116, in accordance with one embodiment of the present invention.
Figure 13C:
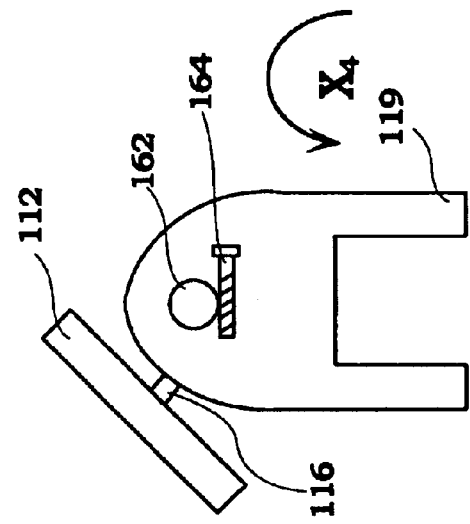
FIG. 13C shows a tire turned in a direction $X_4$ in accordance with one embodiment of the present invention.
Figure 13B:
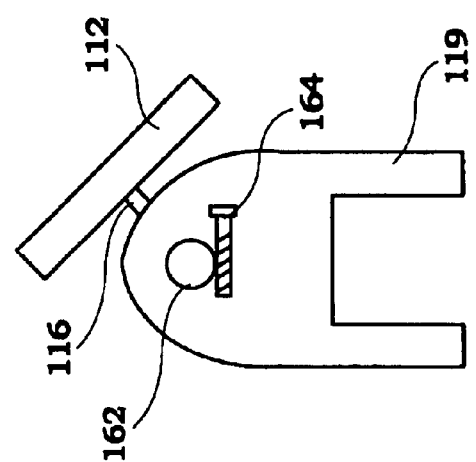
FIG. 13B shows a tire turned in a direction $Y_4$ in accordance with one embodiment of the present invention.

FIG. 13A shows the interaction of the worm 164 with the worm gear 162 within the spindle yoke 119 in accordance with one embodiment of the present invention. The worm gear 162 is coupled to the tire spindle 116 using any suitable technique known in the art, e.g., welding and fasteners. As the worm gear 162 is rotated by the worm 164, the tire spindle 116 will rotate with the gear to rotate the tire 112, as will be described with reference to FIGS. 13B and 13C. When the worm 164 is rotated with the flex cable 110 in a direction $Y_3$ as shown in FIG. 13A, the worm gear 162 will rotate in the direction $Y_4$, thereby turning the tire 112 in the direction $Y_4$, as shown in FIG. 13B. Referring back to FIG. 13A, when the worm 164 is rotated with the flex cable 110 in a direction $X_3$ as shown in FIG. 13A, the worm gear 162 will rotate in a direction $X_4$, thereby turning the tire 112 in the direction $X_4$, as shown in FIG. 13C.

Figure 14A:
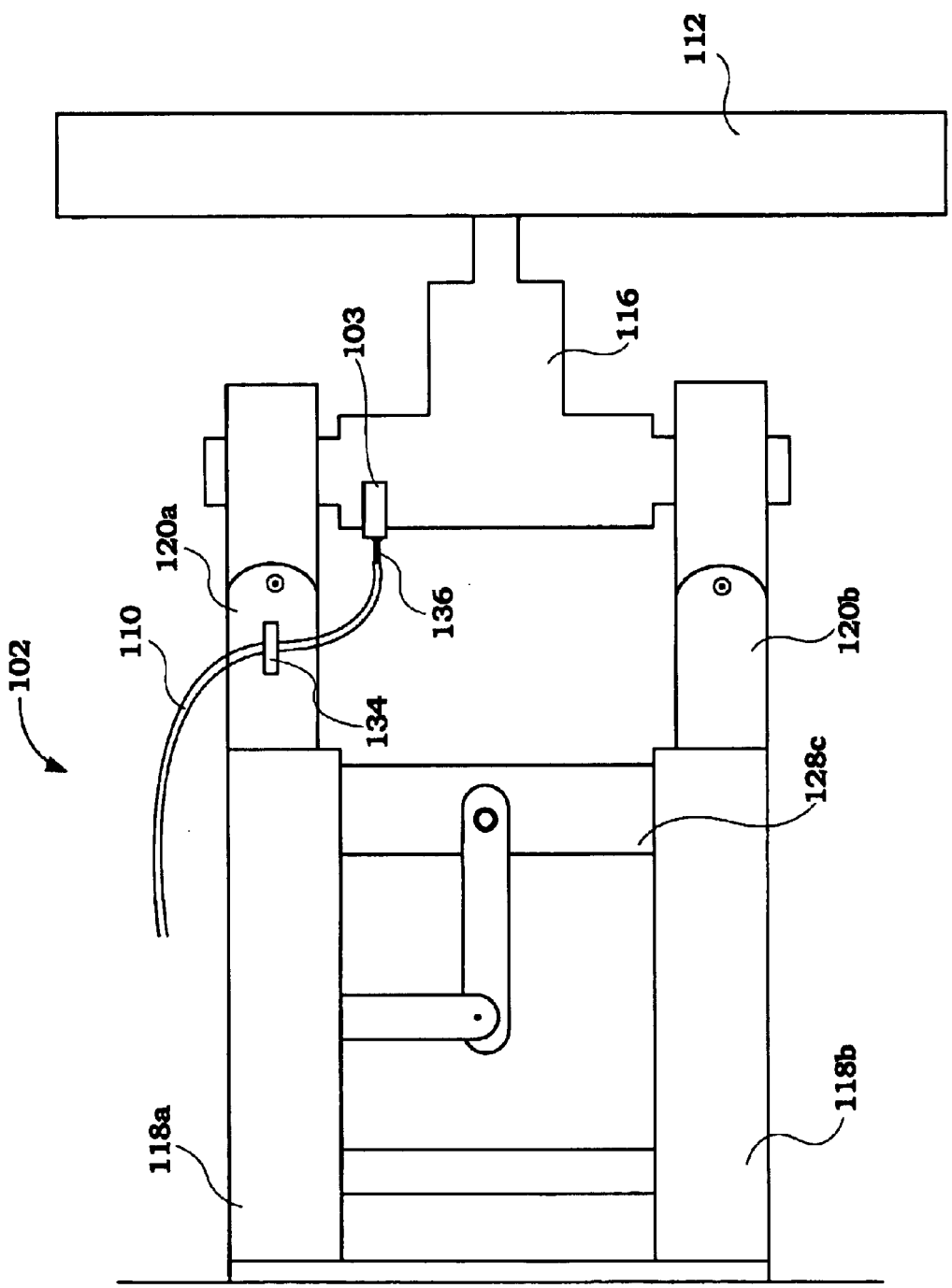
FIG. 14A is another embodiment of the present invention illustrating a steering push/pull assembly used to effectuate steering of a tire.

FIG. 14A illustrates another embodiment of the present invention in which a steering push/pull assembly 103 is used to effectuate steering of the tire 112. The flex cable 110 is attached to the primary link 120a and connects to the spindle 116. The flex cable 110 may be attached to the primary link 120a using a clip 134, which holds the flex cable 110 against the primary link 120a so that an outer covering of the flex cable 110 does not move in relation to the primary link 120a.

FIGS. 14B–14D show top views of the steering push/pull assembly 103 with the tire 112 turned in different positions. The steering push/pull assembly 103 includes a push/pull pin 136 inside the flex cable 110 which connects the steering push/pull assembly 103 with the flex cable 110. In FIG. 14B, the tire 112 is shown in a neutral position where the tire 112 is not being turned. In FIG. 14C, the tire 112 is turned in a direction $X_1$ when the push/pull pin 136 is pulled from the steering push/pull assembly 103 in direction $X_2$ in response to an input received from the driver of the vehicle 200. As the push/pull pin 136 is pulled from the steering push/pull assembly 103 in the direction $X_2$, the tire spindle 116 and the tire 112 rotate in the direction $X_1$. In FIG. 14D, the tire is turned in direction $Y_1$ when the push/pull pin 136 is pushed into the steering push/pull assembly 103 in direction $Y_2$ in response to an input received from the driver of the vehicle 200. As the push/pull pin 136 is pushed into the steering push/pull assembly 103 in the direction $Y_2$, the tire spindle 116 and the tire 112 rotate in the direction $Y_1$. The flex cable is fixed to the primary link 120a as shown in FIG. 14A so that the push/pull pin 136 is free to move inside the flex cable 110 as shown in FIGS. 14B–D.

Figure 15:
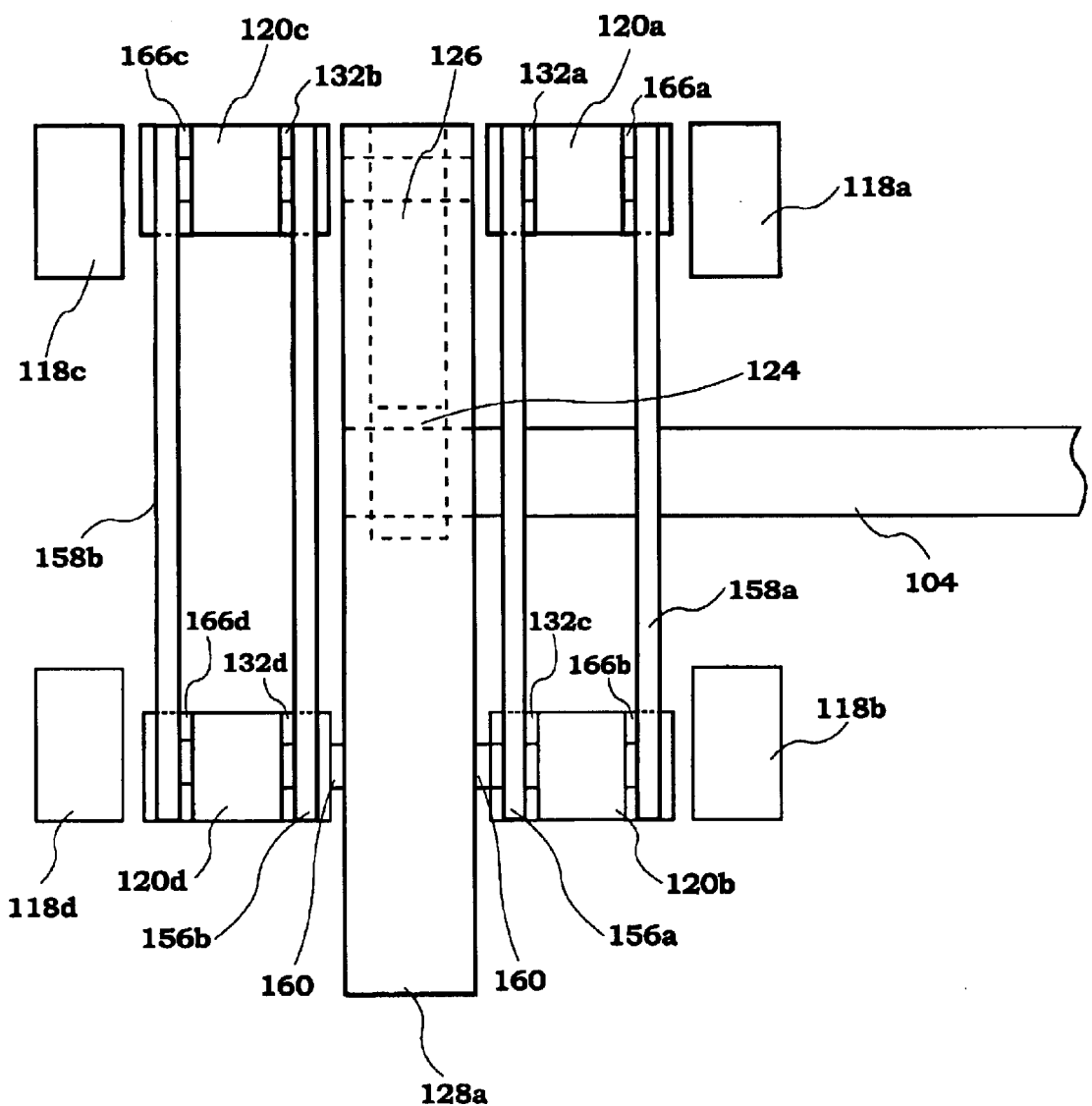
FIG. 15 is a rear view of a suspension in accordance with one embodiment of the present invention.

FIG. 15 is a rear view of the suspension 102 in accordance with one embodiment of the present invention. FIG. 15 depicts the orientation of the translation links 158a and 158b and the rotation links 156a and 156b with respect to the primary links 120a–d. The translation link 158a and the rotational link 156a connect with the primary links 120a and 120b. The translation link 158b and the rotational link 156b connect with primary links 120c and 120d. The rotation links 156a and 156b connect to the vehicle 200 via the substructure 128a. The rotation links 156a and 156b connect with the substructure 128a with the pin connection 160. Thus, as the suspension 102 adjusts the ride height H of the vehicle 200, an end of the rotational links 156a and 156b connected to the substructure 128a via the pin connection 160 remains stationary and rotates about the pin connection 160. The pin connection 160 is shown adjacent to the primary links 120b and 120d. It should be noted that the pin connection 160 may also be located adjacent the primary links 120a and 120c such that an end of the rotation links 156a located adjacent the primary links 120a and 120c remains stationary during operation of the suspension 102.

The present invention provides a number of significant advantages over the prior art. In conventional suspension systems, the spring rates of the springs used therein are adversely affected as the ride height of a vehicle is adjusted. The steering ratio also changes as the ride height of a vehicle is adjusted. In addition, the change in ride height alters the castor track and camber of a tire connected to the suspension.

In contrast, in the suspension system of the present invention, a torsion spring takes the load of the suspension. As the ride height of a vehicle is changed, the relative positions of the ends of the torsion spring remain stationary, thus an additional load is not placed on the torsion spring as the ride height is altered. As such, the load on the torsion spring remains the same and the spring rate of the torsion spring remains unchanged. To avoid steering problems, a flexible cable may be used to control the steering of the tires connected to the suspension system of the present invention. The flexibility of the flex cable allows the steering ratio for the steering mechanism to remain unchanged as the ride height of a vehicle is adjusted. Therefore, the steering mechanism of the suspension system avoids the prior art problem of "bump steer."

To maintain the proper orientation of tires supported by the suspension system of the present invention, the links used in the suspension system satisfy the Scott-Russell relationship. By using links that satisfy the Scott-Russell relationship, it is ensured that the camber of tires supported by the suspension system will always remain perpendicular to the surface upon which they are traveling. In addition, the use of four Scott-Russell linkages per wheel enables the suspension system of the present invention to resist fore and aft lateral forces imparted to the suspension system during normal operation of the vehicle.

Although the suspension of the invention has been described in some detail for purposes of clarity of understanding, it will be apparent that certain changes and modifications may be made to the suspension described herein. For example, if desired, the suspension system may include only three Scott-Russell linkages per wheel while still providing the advantages described herein. Accordingly, the embodiments described herein are to be considered as illustrative and not restrictive, and the scope of the invention is to be defined by the appended claims.

What is claimed is:

1. A vehicle suspension system for adjusting a ride height of a vehicle, the vehicle suspension system comprising for each wheel of the vehicle:
   first, second, third, and fourth structure arms;
   first, second, third, and fourth outer control links, each of the outer control links being pivotably attached to a corresponding structure arm, and each of the four outer control links having an aperture extending transversely therethrough;
   first, second, third, and fourth primary links having first and second ends, the first end of each of the four primary links being configured to be coupled to a spindle yolk, and each of the four primary links having an aperture extending transversely therethrough;
   first, second, third, and fourth inner control arms having first and second ends, the first end of two of the inner control arms being configured to be coupled to a shock absorber, and the second end of each of the four inner control arms having an aperture extending transversely therethrough;
   a torsion spring;
   a torsion arm having first and second ends, the first end being rigidly attached to the torsion spring;
   an attachment link having first and second ends, the first end being pivotably attached to the second end of the torsion arm, and the second end of the attachment link having an aperture therethrough;
   a pin extending through the apertures in the attachment link, the first and second inner control arms, the first and second primary links, and the first and second outer control links;
   first and second translation links having first and second ends, the first ends of the first and second translation links being pivotably attached to respective second ends of the first and second primary links, and the second ends of the first and second translation links being pivotably attached to respective second ends of the third and fourth primary links;
   first and second rotation links having first and second ends, the first ends of the first and second rotation links being pivotably attached to respective second ends of the first and second primary links, the second ends of the first and second rotation links being configured to be pivotably attached to a frame of the vehicle; and
   a worm gear for rotating the torsion spring, wherein rotation of the torsion spring causes the torsion arm to rotate and the rotation of the torsion arm in turn causes the attachment link to move the pin in either an upward or downward direction, the upward or downward movement of the pin causing the first, second, third, and fourth primary links to move in an upward or downward direction to adjust a ride height of the vehicle.

2. The vehicle suspension system of claim 1, further comprising:
   a second pin, the second pin extending through the apertures in the third inner control arm, the third primary link, and the third outer control link; and
   a third pin, the third pin extending through the apertures in the fourth inner control arm, the fourth primary link, and the fourth outer control link.

3. The vehicle suspension system of claim 1, wherein the worm gear is manually controlled by a driver of the vehicle from within a cabin of the vehicle.

4. The vehicle suspension system of claim 1, wherein the worm gear is automatically controlled by a microprocessor.

5. The vehicle suspension system of claim 4, wherein the microprocessor receives an input from a device that measures a dynamic parameter of the vehicle.

6. The vehicle suspension system of claim 5, wherein the dynamic parameter is one of a speed of the vehicle, a pitch and body roll of the vehicle, and a lateral acceleration of the vehicle.

7. A vehicle, comprising:
   a torsion spring associated with each wheel of the vehicle;
   an adjustable suspension system for adjusting a ride height of the vehicle, the adjustable suspension system comprising four Scott-Russell linkages for each wheel of the vehicle, at least one of the Scott-Russell linkages for each wheel of the vehicle being coupled to the torsion spring associated with the respective wheel of the vehicle to adjust a ride height of the vehicle while maintaining a substantially constant camber angle for the wheels of the vehicle, wherein the adjustable suspension system includes first, second, third, and fourth structure arms, and each of the Scott-Russell linkages includes an outer control link, the outer control link being pivotably attached to a corresponding structure arm, and the outer control link having an aperture extending transversely therethrough;

a primary link having first and second ends, the first end of the primary link being configured to be coupled to a spindle yolk, and the primary link having an aperture extending transversely therethrough;

an inner control arm having first and second ends, the second end of the inner control arm having an aperture extending transversely therethrough;

a translation link having first and second ends, the first end of the translation link being pivotably attached to the second end of the primary link; and a rotation link having first and second ends, the first end of the rotation link being pivotably attached to the second end of the primary link, the second end of the rotation link being configured to be pivotably attached to a frame of the vehicle;

a worm gear for rotating the torsion spring associated with each wheel of the vehicle; and a steering assembly having a flexible cable that allows a substantially constant steering ratio to be maintained when the ride height of the vehicle is adjusted.

8. The vehicle of claim 7, further comprising:

a torsion arm having first and second ends, the first end being rigidly attached to the torsion spring associated with the respective wheel of the vehicle; and an attachment link having first and second ends, the first end being pivotably attached to the second end of the torsion arm, and the second end of the attachment link being pivotably attached to a pin.

* * * * *